(12) United States Patent
Wall et al.

(10) Patent No.: US 6,371,765 B1
(45) Date of Patent: Apr. 16, 2002

(54) INTERACTIVE COMPUTER-BASED TRAINING SYSTEM AND METHOD

(75) Inventors: Robert S. Wall, Richardson; Donald R. Warner, Sachse; Jackie R. Closson, Plano, all of TX (US)

(73) Assignee: MCIWorldcom, Inc., Jackson, MS (US)

( * ) Notice: Subject to any disclaimer, the term of this patent is extended or adjusted under 35 U.S.C. 154(b) by 0 days.

(21) Appl. No.: 09/436,147

(22) Filed: Nov. 9, 1999

(51) Int. Cl.[7] .......................... G09B 19/10; G09B 19/24
(52) U.S. Cl. .......................... 434/224; 434/350; 703/13
(58) Field of Search ................................. 434/350, 236, 434/307 R, 322, 219, 224

(56) References Cited

U.S. PATENT DOCUMENTS

| | | | | |
|---|---|---|---|---|
| 4,316,720 A | * | 2/1982 | Ackerman | 434/224 |
| 4,931,018 A | * | 6/1990 | Herbst et al. | 434/234 |
| 4,964,803 A | * | 10/1990 | Chul | 434/118 |
| 5,311,422 A | * | 5/1994 | Loftin et al. | 364/401 |
| 5,791,907 A | * | 8/1998 | Ramshaw et al. | 434/262 |
| 5,823,781 A | * | 10/1998 | Hitchcock et al. | 434/118 |
| 5,853,292 A | * | 12/1998 | Eggert et al. | 434/262 |
| 6,033,226 A | * | 3/2000 | Bullen | 434/219 |
| 6,149,441 A | * | 11/2000 | Pellegrino et al. | 434/350 |
| 6,164,974 A | * | 12/2000 | Carlile et al. | 434/322 |
| 6,193,519 B1 | * | 2/2001 | Eggert et al. | 434/262 |

* cited by examiner

Primary Examiner—Joe H. Cheng
Assistant Examiner—Kathleen M. Christman

(57) ABSTRACT

An interactive computer-based training (ICBT) system and method operable over a computer network for training users. The ICBT system is provided with a state-machine-based hardware simulator for emulating various hardware states associated with a piece of equipment on which the users are to receive interactive training. A software simulator provided as a command inference engine is coupled to the hardware simulator, wherein the software simulator allows the users to interactively interrogate the emulated piece of equipment for its software functionality. One or more independently selectable learning modules are provided as part of the ICBT system, wherein each learning module includes one or more lesson plans related to the hardware and software functionality of the emulated piece of equipment. Also, the learning modules are inter-dependently associated with the hardware and software simulators. A user interface is provided for selecting one or more learning modules and for providing inputs from the users to the hardware and software simulators of the emulated piece of equipment so as to modify its configuration. The users can select any lesson plan or execute a portion of an ICBT session at any point therein without having to follow any sequential procedure.

20 Claims, 24 Drawing Sheets

Command Reference

Command Categories ←1042

- Basic Commands
- Configuration File Commands
- System Image & Microcode Commands
- ▲ Router Memory Commands
- Booting Commands
- File Transfer Commands
- All Commands

Router Memory Commands 1044

- cd
- copy
- copy verify
- copy verify bootflash
- delete
- dir
- erase
- erase bootflash
- erase flash
- format
- memory-size Iomem
- partition
- partition flash
- pwd

1046 cd

To set the default Flash device for the system, use the cd EXEC command.

cd [*device*:]

*device*: (Optional) Default device. The colon (:) is required. Valid devices are as follows:

Quiz - 1

List the seven layers of the OSI standard:

layer 1
layer 2
layer 3
layer 4
layer 5
layer 6
layer 7

1023
1036
1002

Hint

Introduction 1006
Hardware 1008
Software 1010
Trouble Shooting 1012
Reference 1014
Help 1016

Terms and Acronyms Glossary

A B C D E F G H I J K L M N O P Q R S T U V W X Y Z

C cable
Transmission medium of copper wire or optical fiber wrapped in a protective cover.

cable range
Range of network numbers that is valid for use by nodes on an extended AppleTalk network. The cable range value can be a single network number or a contiguous sequence of several network numbers. Node addresses are assigned based on the cable range value.

cable television
See CATV.

CAC
connection admission control. The set of actions taken by each ATM switch during connection setup in order to determine whether a connections requested QOS will violate the QOS guarantees for established connections. CAC is also used when routing a connection request through an ATM network.

California Education and Research Federation Network
See CERFnet.

call priority
Priority assigned to each origination port in circuit-switched systems. This priority defines the order in which calls are reconnected. Call priority also defines which calls can or cannot be placed during a bandwidth reservation. See also bandwidth reservation.

call reference value

FIG. 10n

INTERACTIVE COMPUTER-BASED TRAINING SYSTEM AND METHOD

CROSS-REFERENCE TO RELATED APPLICATIONS

This application discloses subject matter related to the subject matter disclosed in the following co-assigning patent application: "State Transition System and Method in Interactive Computer-based Training," filed Nov. 9, 1999, Ser. No. 09/436,553 in the names of: Robert S. Wall, Don Warner, Jackie R. Clossen, and Patrick J. Doggett.

BACKGROUND

1. Technical Field of the Invention

The present invention relates generally to electronic tutoring systems and methods, and more particularly, to an interactive computer-based training (ICBT) system and method operable over an Internet Protocol (IP)-based public computer network such as the Internet, a corporate Intranet, and the like.

2. Description of Related Art

Maintaining a skilled and innovative work force has always been important for businesses that strive to attain a competitive edge in the marketplace. Companies and organizations have come to recognize the value of intelligent and energetic people whose chief asset is their ability and desire to learn. The training opportunities presented in today's information age have increased with the advent of new technologies, creating an even broader range of tutoring services available to consumers.

The need for well-trained individuals is even more acute in technology-based businesses such as, for example, the telecommunications industry. Service providers in this industry operate and maintain vast telecommunications networks covering huge geographic areas. These networks, formed by interconnecting an immense array of diverse and often highly complex pieces of equipment, pose enormous challenges to field technicians whose responsibilities typically include installation, repair and maintenance of network equipment at network facilities and remote customer sites, and troubleshooting service calls night and day, seven-days-a-week. The service calls often involve routine as well as urgent trouble calls to make repairs that will enable the equipment, often purchased from third-party vendors, to continue functioning for the customer. Clearly, providing proper training to such field technical personnel and other technical/non-technical personnel on a broad assortment of network equipment is highly critical in order to be able to reduce the downtime associated with failed or poorly functioning equipment.

One of the conventional methods to impart appropriate technological information on an "as needed" basis to field technicians is to provide a centralized technical staff to answer questions the technicians may have concerning specific network equipment. This solution is costly. Support personnel may have to answer the same question for a number of field technicians. In addition, support personnel typically cannot provide systematic training that is needed, but rather provide "fire-fighting" type training to get a technician through a particular problem. This will not provide the technician a comprehensive understanding of the network equipment he or she is required to handle.

Another conventional method of providing instruction is by way of classroom training at a centralized location. However, this method is also highly disadvantageous. Such training is limited in classroom size and often very expensive in terms of field technicians' time and the actual monetary cost involved. Further, this problem is compounded by the fact that frequent equipment updates require continual re-training of the technicians in order for them to stay current and/or competent.

Another limitation of classroom training is that because of the disparity in proficiency levels of various technicians, training classes do not provide an appropriate level of training for every technician. Since such classes cannot be tailored to every individual's proficiency level, each technician may receive the entire training course involving complex subject matter. As a result, many technicians may feel overwhelmed while some may receive training they do not need.

Computer-based training (CBT) methods alleviate some of the deficiencies of the conventional solutions set forth hereinabove. However, the existing CBT solutions are not without drawbacks of their own. First, although courseware designed for CBT sessions is typically provided to be self-paced, flexibility in selecting different lessons or re-arranging the order of lessons plans is rather limited. For example, because the courseware is typically built around a pre-arranged set of lessons, the user cannot go from one lesson to another without first completing a previously-required lesson plan. Accordingly, such lack of flexibility renders the current CBT schemes a poor choice for effectively presenting "real-world" training with a self-paced multi-path flow. Furthermore, these solutions do not provide a scheme for evaluating the amount of training each individual end-user (e.g., a technician) needs in order to bring the individual up to a predetermined level of proficiency.

In addition, the existing CBT solutions are not optimized for providing adequate levels of instruction on complicated equipment having tightly integrated hardware and software modules and sub-modules. Those of ordinary skill in the art should readily appreciate that lack of appropriate behavioral models of the equipment with sufficient degree of realistic complexity renders the resultant CBT sessions rather insufficient for providing high quality training.

SUMMARY

Accordingly, in one aspect, the present invention is directed to an interactive computer-based training (ICBT) system operable over a computer network for training users. The ICBT system comprises a hardware simulator based on a state machine engine for emulating one or more hardware states associated with a piece of equipment on which the users are to receive interactive training. Also included is a software simulator that is inter-dependent on the hardware simulator for accurately emulating the software functionality of the equipment. The software simulator is provided as a command inference engine that allows the users to interactively interrogate the emulated equipment for its software functionality commands. One or more independently selectable learning modules, each including one or more lesson plans related to the hardware and software functionality of the emulated piece of equipment, are also included. The learning modules are provided to be inter-dependently associated with the hardware and software simulators of the equipment. A user interface is included for selecting one or more learning modules in addition to effectuating inputs from the users to change the hardware and software configurations and simulators of the equipment.

In another aspect, the present invention is directed to an interactive CBT method for training users on equipment having hardware and software functionality. The method provides for simulating the hardware and software functionality of the equipment by employing inter-dependent state machines wherein state transitions are based on tracking prior dependencies and drawing inferences therefrom. One or more independently selectable learning modules are provided in the method, wherein each module includes lesson plans related to the hardware and software functionalities of the equipment. Inputs are provided by the users to effectuate different hardware and software configurations of the equipment. Thereafter, configuration-dependent learning modules may be selected based on the different hardware and software configurations.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
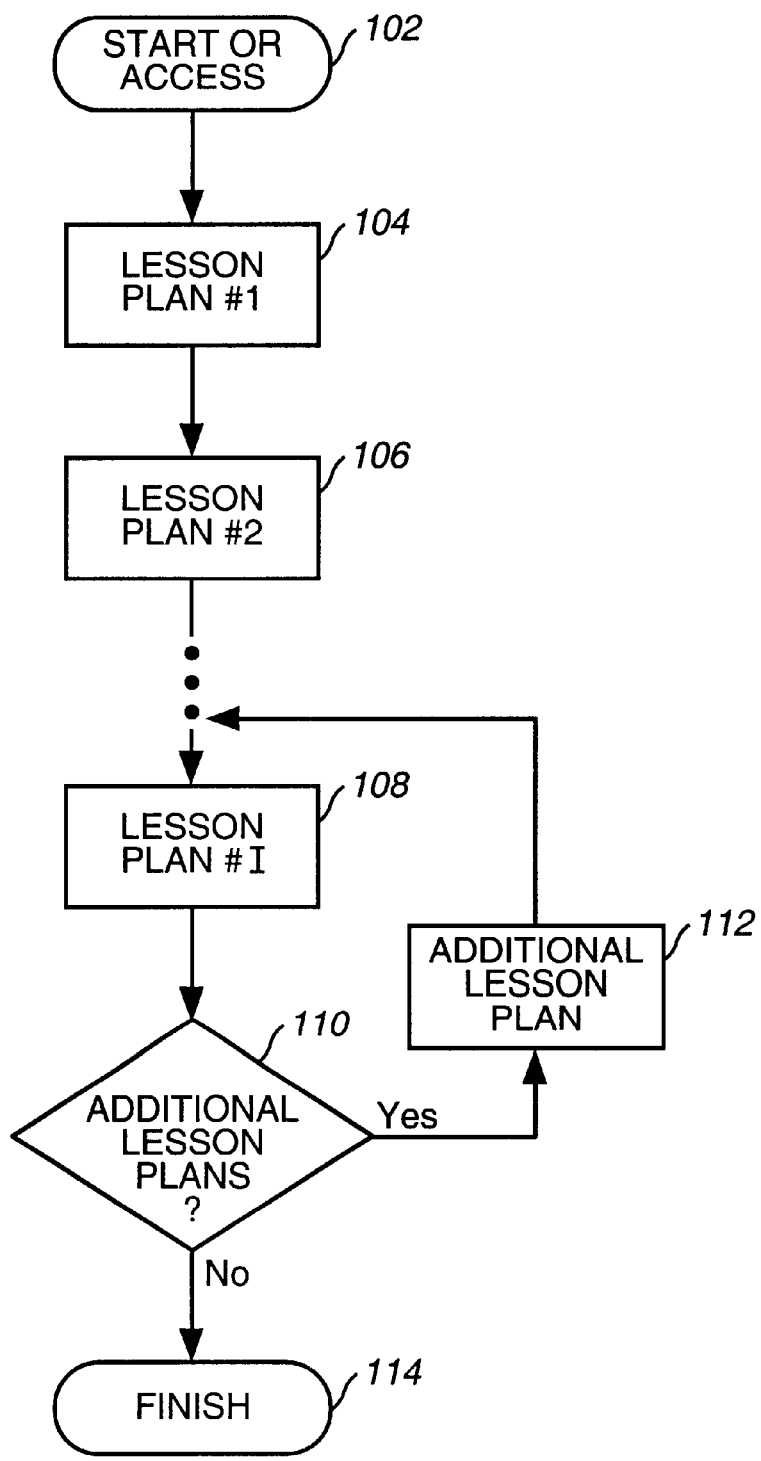
FIG. 1 (Prior Art) depicts a flow diagram of an exemplary conventional CBT method.

In the drawings, like or similar elements are designated with identical reference numerals throughout the several views, and the various elements depicted are not necessarily drawn to scale. Referring now to FIG. 1, depicted therein is a simplified flow diagram of an exemplary conventional CBT method for presenting selected courseware to an end-user. The conventional CBT method is generally provided as a series of discrete lesson plans with a pre-defined order, i.e., a beginning, middle and an end. In actual operation, such a method typically displays a series of user interface screens for sequentially presenting the lesson plans to the end-user, for example, a field dispatch technician or an employee/trainee at a facility. The entire courseware may comprise a predetermined number of lessons or lesson plans, and the end-user cannot typically change the order of the lessons being presented. Accordingly, upon starting or accessing the CBT courseware (step 102), the end-user goes through taking the lesson plans in the order they are presented (steps 104 through 108), until a determination is made as to whether the end-user wants to continue with any additional lessons (decision block 110). If so, the additional lesson plan or plans may then be presented (step 112) for the end-user's benefit. On the other hand, should the end-user decide to quit the CBT session, option to deactivate and/or finish the session is generally available (step 114).

It should be readily appreciated by those of ordinary skill in the art that while a uni-linear CBT method such as one set forth in the foregoing is relatively easy to design, implement and use, and may overcome the drawbacks of a classroom-based training scheme, there still exist several deficiencies and disadvantages in the conventional CBT methods as set forth in the Background section of the present patent application.

Figure 2:
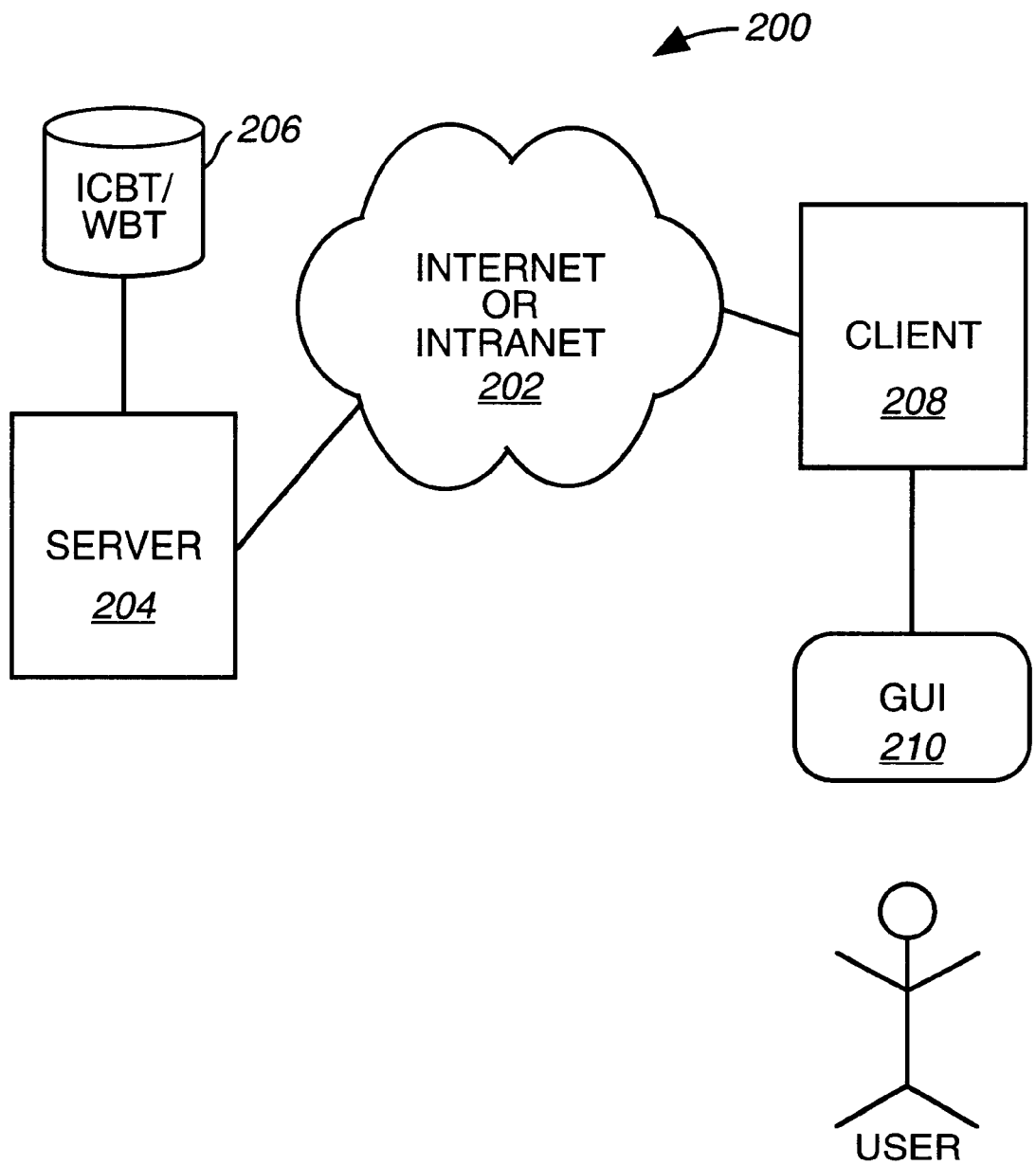
FIG. 2 depicts a functional block diagram of a presently preferred exemplary embodiment of an on-line interactive CBT (ICBT) system provided in accordance with the teachings of the present invention.

FIG. 2 depicts a functional block diagram of a presently preferred exemplary embodiment of an on-line interactive CBT (ICBT) or Web-based training (WBT) system 200 provided in accordance with the teachings of the present invention. Preferably, the courseware of the ICBT system 200 is provided as part of a server-based multimedia application package 206 running on one or more servers, for example, server 204, that are connected to a computer network 202 such as the Internet, Intranet, et cetera. A client computer 208 (e.g., a laptop computer and the like) may preferably be used for accessing the courseware on an "as-needed" basis upon effectuating suitable authentication and log-on procedures. A graphic user interface 210 provided with the client computer 208 aids the end-user for interacting with the courseware 206. Preferably, the end-user, who may be a field technician working at a remote site, can access the courseware on-line and obtain interactive tutoring or training on a piece of equipment that the end-user is dispatched to install, repair, maintain, or troubleshoot a service call at the remote site.

In accordance with the teachings of the present invention, the courseware of the ICBT system is provided with an inter-dependent modular architecture for facilitating maximum user flexibility. As will be described in greater detail hereinbelow, both hardware and software functionality of the equipment for which the courseware is designed are modeled as inter-dependent state machines that allow transitions via multiple paths based on state dependency and reference value inferences. Furthermore, the courseware is preferably provided as an inter-dependent collection of various hardware and software lesson plans, test/quiz sessions, troubleshooting menus, on-line help modules, and multimedia presentations (e.g., video clips, photographs, et cetera), wherein the end-user is capable of selecting any lesson plan at will or executing only a portion of a training session at any point in the courseware depending upon the need.

Figure 3:
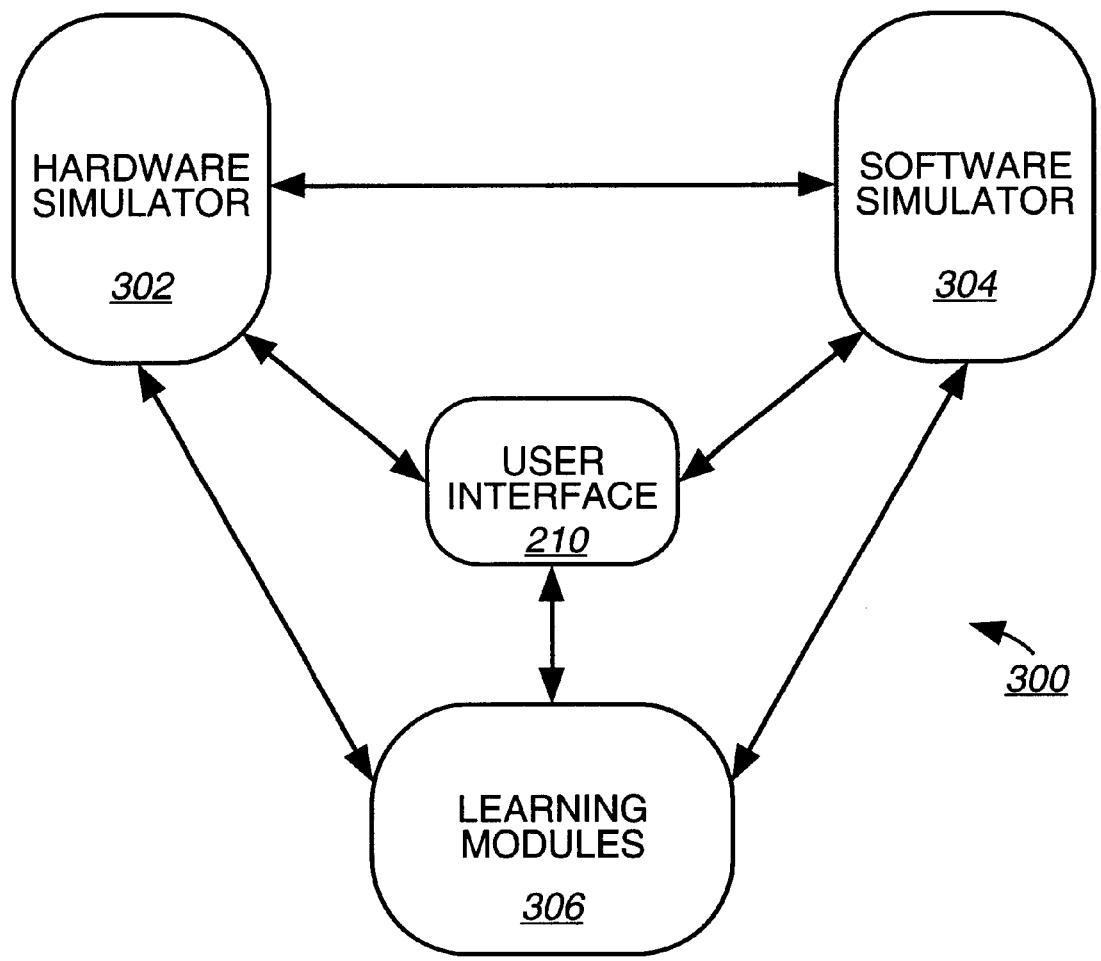
FIG. 3 is a functional block diagram illustrating the inter-dependent modular architecture of the ICBT system of the present invention.

FIG. 3 is a functional block diagram illustrating the inter-dependent modular architecture 300 of an exemplary ICBT system. A hardware simulator 302 is provided for emulating the hardware functionality of a component or device. A state machine engine forms the basis for the hardware simulator 302 wherein the sub-components of the device are characterized and the states in which the device may exist, based upon the conditions of the sub-components, are defined. For example, various connectors, switches, cables, input/output (I/O) port configurations, power-on conditions, et cetera, of a device are abstracted and assigned logic values based on their states or conditions such as ON, OFF, specific values, connections made or not made, et cetera.

A software simulator 304 is provided for emulating the software functionality, or a subset thereof, of the device. A suitable inter-dependent state machine engine also forms the basis for the device software simulator 304. The various states of the hardware and software state machine engines are provided to be inter-dependent and, accordingly, affect the respective state transitions appropriately in order to emulate the device functionality substantially accurately and completely.

One or more learning modules 306 are provided as part of the ICBT system, preferably including a plurality of self-contained multimedia lesson plans, on-line help screens, troubleshooting modules, test/quiz portions, appropriate technology background information, glossaries, et cetera. Preferably, the components of the learning modules are organized in reference to the various hardware and software portions of the abstracted device and are appropriately associated with the hardware and software simulators of the ICBT system.

A graphic user interface 210 facilitates the end-user to access and interact with the various modules of the ICBT system. Using the interface 210, the end-user can manipulate the various abstracted sub-components of the hardware simulator 302 as part of a lesson plan. For example, the end-user may turn on or off various switches, make connections, turn on power to the device, et cetera, by effectuating an appropriate pointing device (e.g., a mouse) on the icons of the interface 210. Also, various software commands for the device may be entered through a software command interface portion of the user interface 210. Further, the user interface 210 preferably comprises appropriate display windows or dialog boxes to help the end-user navigate through the various multimedia teaching/training aids, testing and evaluation modules, etc.

Figure 4:
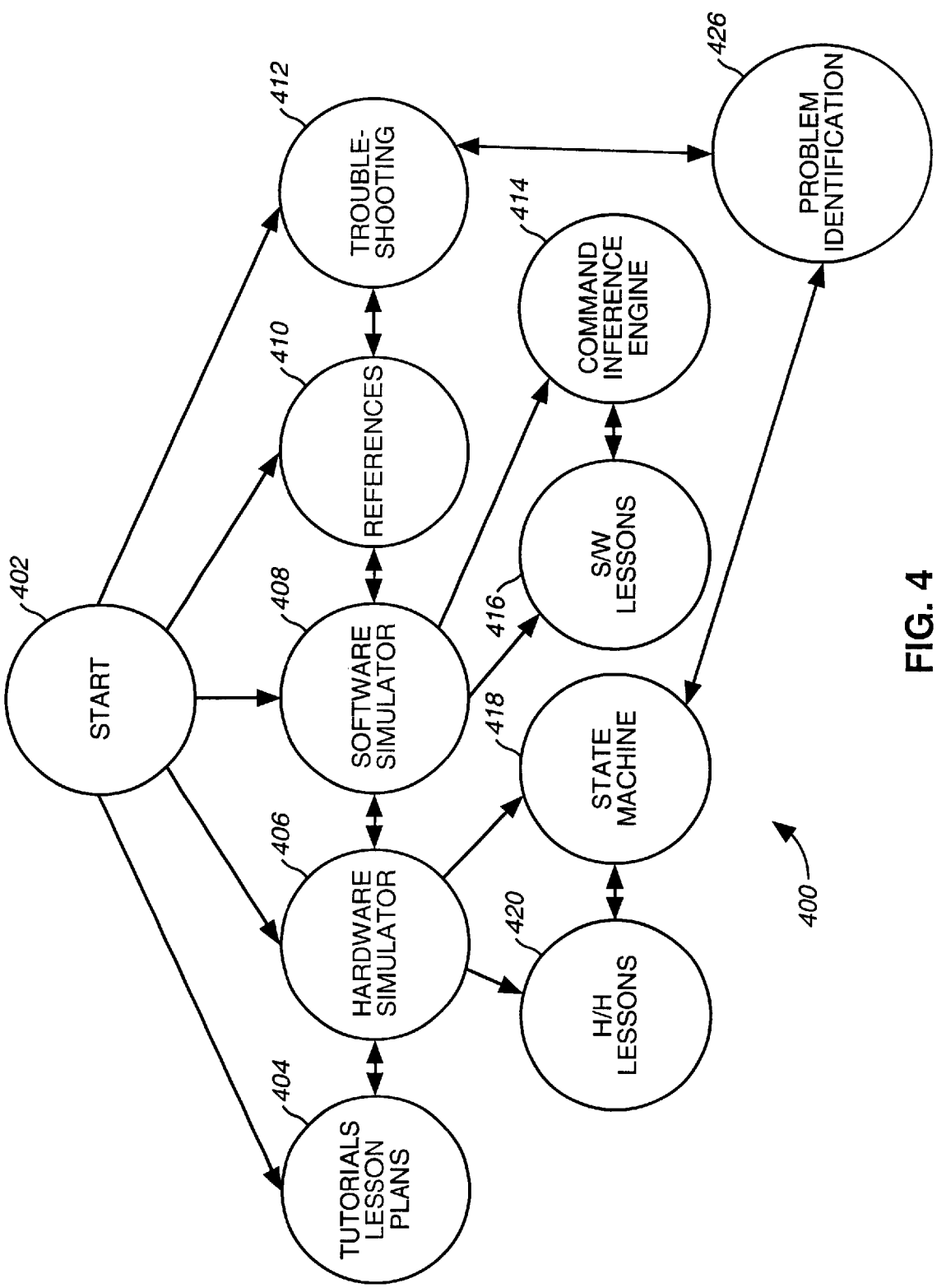
FIG. 4 depicts a presently preferred exemplary embodiment of the inter-dependent modular ICBT system.

Referring now to FIG. 4, depicted therein is a presently preferred exemplary embodiment of the inter-dependent modular architecture 400 of an ICBT system provided in accordance with the teachings of the present invention. From a starting stage 402, the end-user can independently interact with a tutorial or lesson plan module 404, a hardware simulator 406, a software simulator 408, a reference module 410, or a troubleshooting module 412. As described in the foregoing, the hardware and software simulators of the modular architecture 400 are underpinned by their respective state machine engines. The hardware simulator 406 is associated with its lesson module 420 and the state machine engine 418. Similarly, the software simulator 408 is also associated with its lesson module 416 and a command inference engine 414 provided as the software state machine. The reference module 410 is also provided to be independently accessible to the end-user and is preferably coupled to the troubleshooting module 412.

In accordance with the teachings of the present invention, a problem identification module 422 preferably maintains a personal profile for the end-user and provides a list of most common causes of a particular error or problem encountered. For example, the list may include "Top 10" causes for the end-user with respect to a specific problem, thereby narrowing and personalizing the problem identification process. It should be appreciated by those of ordinary skill in the art that the personalized problem identification process provided herein substantially expedites the troubleshooting tasks and, accordingly, reduces equipment downtime in the field.

Figure 5:
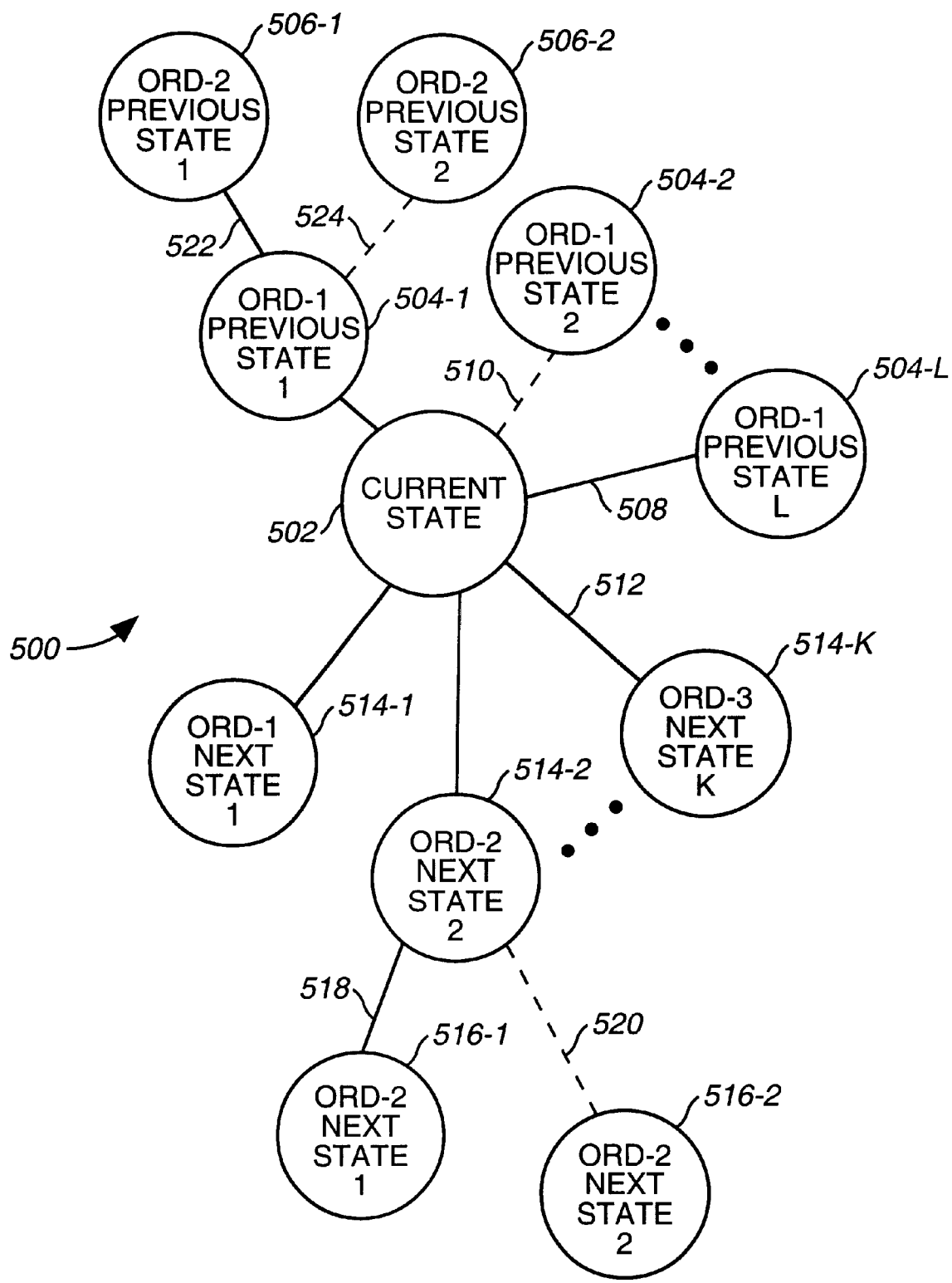
FIG. 5 depicts a state transition scheme used in implementing a simulator engine for emulating hardware and software components of a device for which an ICBT system is provided in accordance with the teachings of the present invention.

FIG. 5 depicts a state transition scheme 500 used in implementing a simulator engine for emulating hardware and software components of a device. In accordance with the teachings of the present invention, state transitions are provided to be inter-dependent upon previous states and the conditions thereat. Further, such inter-dependency may extend beyond the states that are immediately prior to a current state. In other words, state transitions are preferably based upon tracking the dependencies not only with respect to the immediately prior states, but also their previous dependencies as well. In addition, the dependencies may be direct or indirect, based upon whether a logic condition associated with a state is alterable regardless of a previous state's condition, although a specific value of the previous state's condition may be necessary for a more realistic simulation. It should be readily appreciated by those of ordinary skill in the art upon reference hereto that such a "multi-level" inter-dependency scheme in a state machine provides for a robust and fine-grained behavioral model of the device being emulated.

Continuing to refer to FIG. 5, a current state 502 is shown to have dependencies on a plurality of states that are immediately prior to it, for example, state 504-1 through state 504-L. These dependencies may be referred to as the first-order dependencies with respect to the current state 502. Also, the immediately prior states may likewise be denoted as the first-order states. As exemplified in this FIG., the first-order dependencies may comprise both direct (e.g., dependency path 508) and indirect (e.g., dependency path 510) dependencies. Also, the first-order previous state 504-1 is, in turn, exemplified with a direct dependency path 522 (a second-order direct dependency with respect to the current state 502) as well as an indirect dependency path 524 (a second-order indirect dependency for the current state 502).

The current state 502 may transition into any of the first-order next states, for example, state 514-1 through state 514-K, based upon tracking the dependencies as set forth above. Also, the logic conditions of a next state may give rise to a direct as well as an indirect dependency path to another, second-order, next state. For example, the first-order next state 514-2 generates a direct dependency path 518 to a second-order next state 516-1 and an indirect dependency path 520 to another second-order next state 516-2.

Figure 6:
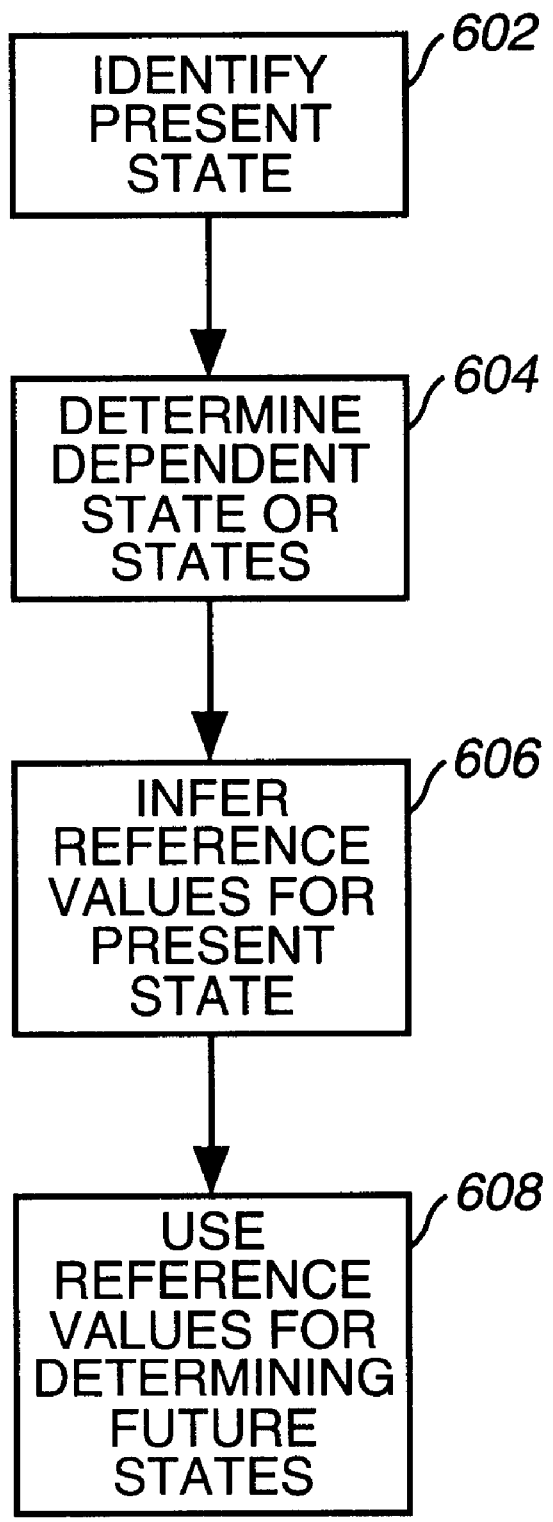
FIG. 6 is a flow diagram of the state transition scheme of the present invention.

Preferably, an Artificial Intelligence (AI)-based inference engine is used for keeping track of the state logics, dependencies and allowable transitions in the state machines of the present invention. FIG. 6 depicts a flow diagram of the state transition scheme 500 described hereinabove. After identifying or ascertaining the present state (step 602), the inference engine determines its dependent state or states and characterizes the dependencies thereof (step 604). Thereafter, one or more reference values associated with the state (or its logic parameters) are inferred (step 606). Typically, the reference values may comprise a set: {NULL; 0; or a specific value}. The values of the references may then be used, in one exemplary embodiment, for determining state transitions (i.e., future states) of the hardware or software state machine's present state.

Figure 7:
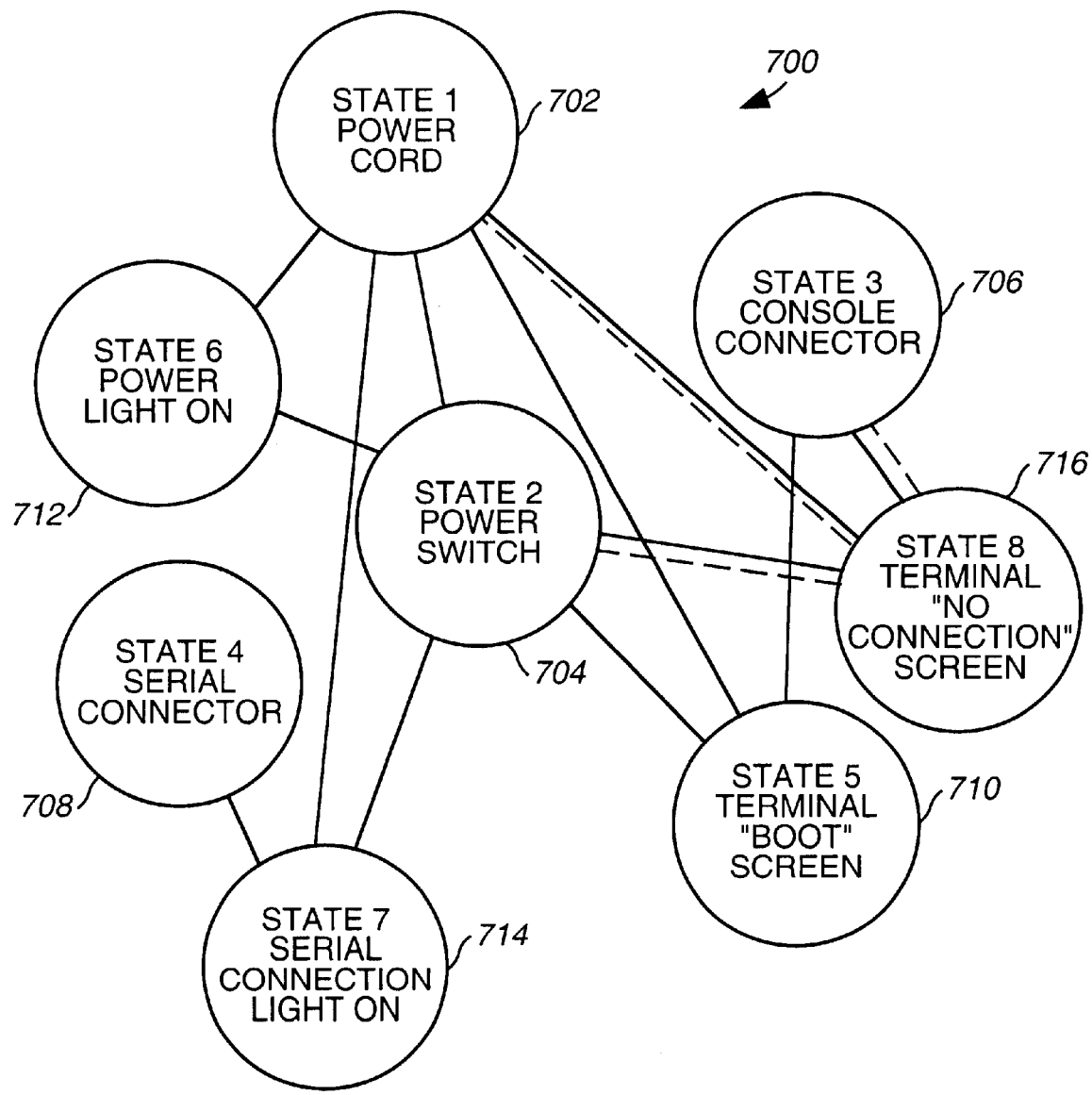
FIG. 7 illustrates a presently preferred exemplary embodiment of a state transition diagram for use with an ICBT system implemented for a router device.

FIG. 7 illustrates a presently preferred exemplary embodiment of a state transition diagram for use with an ICBT system implemented for a router device. For the sake of simplicity, solid lines are used for denoting both direct and indirect dependencies therein. Also, broken lines are shown where a state dependency is an OR condition of its prior states. Eight hardware states exemplified for the router device are described immediately hereinbelow:

STATE 1 (POWER CORD) 702: The Power Cord state is true if the power cord of the router is plugged into the device; otherwise it is false. The end-user activates the Power Cord state by mouse-dragging a suitable cord icon from a supplies list provided with the GUI to the AC power port of the device. No prior dependencies are provided for this state.

STATE 2 (POWER SWITCH) 704: The Power Switch state is true if the power switch of the router is in the ON position and the power cord is plugged in. Otherwise, the logic value of the state is false. The power switch of the device is preferably provided as a toggle switch between ON and OFF positions selectable by mouse-clicks. The end-user activates this state by mouse-clicking on the final dependency of the foregoing two states of the router device (i.e., the order of activating the power switch or the power cord of the device is irrelevant for the purpose of activating State 2). For State 2 to be true, it is dependent on State 1 being true. However, if the power is not plugged in, the switch can still be turned ON or OFF, regardless of the power cord connection. Accordingly, State 2 has an indirect first-order dependency on State 1.

STATE 3 (CONSOLE CONNECTOR) 706: The Console Connector state is true if the console connector wire is plugged into the console connector port of the router device; otherwise it is false. The end-user activates this state by mouse-dragging the console cable connector icon from the supplies list to the console port of the device. No dependencies are provided for the Console Connector state 706.

STATE 4 (SERIAL CONNECTOR) 708: The Serial Connector state is true if the serial connector wire is plugged into the serial connector port of the router device; otherwise it is false. The end-user effectuates this state by mouse-dragging the serial connector cable icon from the supplies list to the serial connector port of the device. Again, no dependencies are provided for the Serial Connector state 708.

STATE 5 (TERMINAL "BOOT" SCREEN) 710: The Terminal "Boot" Screen state is true if the power switch is in the ON position, the power cord is plugged in, and the console connector is connected. The end-user activates this state by mouse-clicking on the final dependency of the three foregoing states of the router device (i.e., the activation order of the previous states does not matter). The Terminal "Boot" Screen is then displayed when the state is true (in the software emulator). When the hardware emulator of the device is being viewed, a green blinking connection light comes on when the state is true.

For State 5 to be true, it is dependent on State 1, State 2 and State 3 being true. If the power cord is not plugged in, the power switch can still be turned ON or OFF, but the router's terminal boot screen will not appear on the display of the GUI. If the power cord is in, the power switch is ON and the console connector cable is not connected, the device's boot screen will not appear also. Further, if the power cord and the console connector are connected but the power switch is in the OFF position, again the boot screen will not appear. Accordingly, State 5 has a direct dependency on State 1, State 2 and State 3.

STATE 6 (POWER LIGHT ON) 712: The Power Light ON state is true if the power switch is in the ON position and the power cord is plugged in; otherwise it is false. The end-user verifies this state by mouse-clicking on the final dependency of the forgoing two states of the router device. When the device hardware emulator is being viewed, a green POWER light comes on when the state is true.

For State 6 to be true, it is dependent on State 1 being true and State 2 being true. If the power cord is not plugged in, the power switch can be toggled between the ON and OFF positions, but no light comes on. Thus, State 6 has a direct dependency on State 1 and State 2.

STATE 7 (SERIAL CONNECTION LIGHT ON) 714: The Serial Connection Light ON state is true if the power switch is in the ON position, the power cord is plugged in, and the serial connector wire is plugged into the serial connector port of the router device. Otherwise, it is false. The end-user verifies this state by mouse-clicking on the final dependency of the previous three states of the device and, again, a green blinking light comes on in the hardware emulator viewing when the state is true.

For State 7 to be true, it is dependent on State 1, State 2 and State 4 being true. If the power cord is not plugged in, the power switch can still be toggled between the ON and OFF positions, but no serial connection light comes on. Also, if the power cord is in, the power switch is ON and the serial cable is not connected, the serial connection light does not come on. Finally, if the power cord is in, the power switch is OFF and the serial cable is connected, again the serial light does not come on. Thus, State 7 has a direct dependency on State 1, State 2 and State 4.

STATE 8 (TERMINAL "No CONNECTION" SCREEN) 716: The Terminal "No Connection" Screen state is true if either the power switch is in the OFF position, the power cord is not plugged in, or the console connector is not connected to the console port of the device. When the state is true, the Terminal "No Connection" Screen is displayed in the software emulator mouse-clicking the power switch of the device produces a blinking light.

For State 8 to be true, it is dependent on either State 1 being false, State 2 being false, or State 3 being false. If the power cord is not plugged in, the power switch can still be toggled between the ON and OFF positions, and the "No Connection" Screen remains visible. If the power cord is in, the power switch is ON and the console cable is not plugged in, the "No Connection" Screen remains visible again. Finally, when the power cord is in, the power switch is OFF, and the console cable is plugged in, the "No Connection" Screen still remains visible. Thus, State 8 has an indirect dependency on each of State 1, State 2 and State 3 being false, or any combination thereof The hardware state model 700 described above is used for building inferences about the different states of the router hardware and software, and appropriate lesson plans and troubleshooting modules related to the state-dependent behavior of the router device. Because whether a particular software command or lesson plan can be simulated or presented, either in the field or in a "virtual" classroom, may be dependent upon a specific combination of the hardware states of the device, the end-user is guided through appropriate hardware setup and configuration before such software simulations or lesson plans may be effectuated. Furthermore, when any errors arise during an ICBT session, invoking suitable troubleshooting module or modules is also dependent upon the behavior of hardware and software states.

Figure 8:
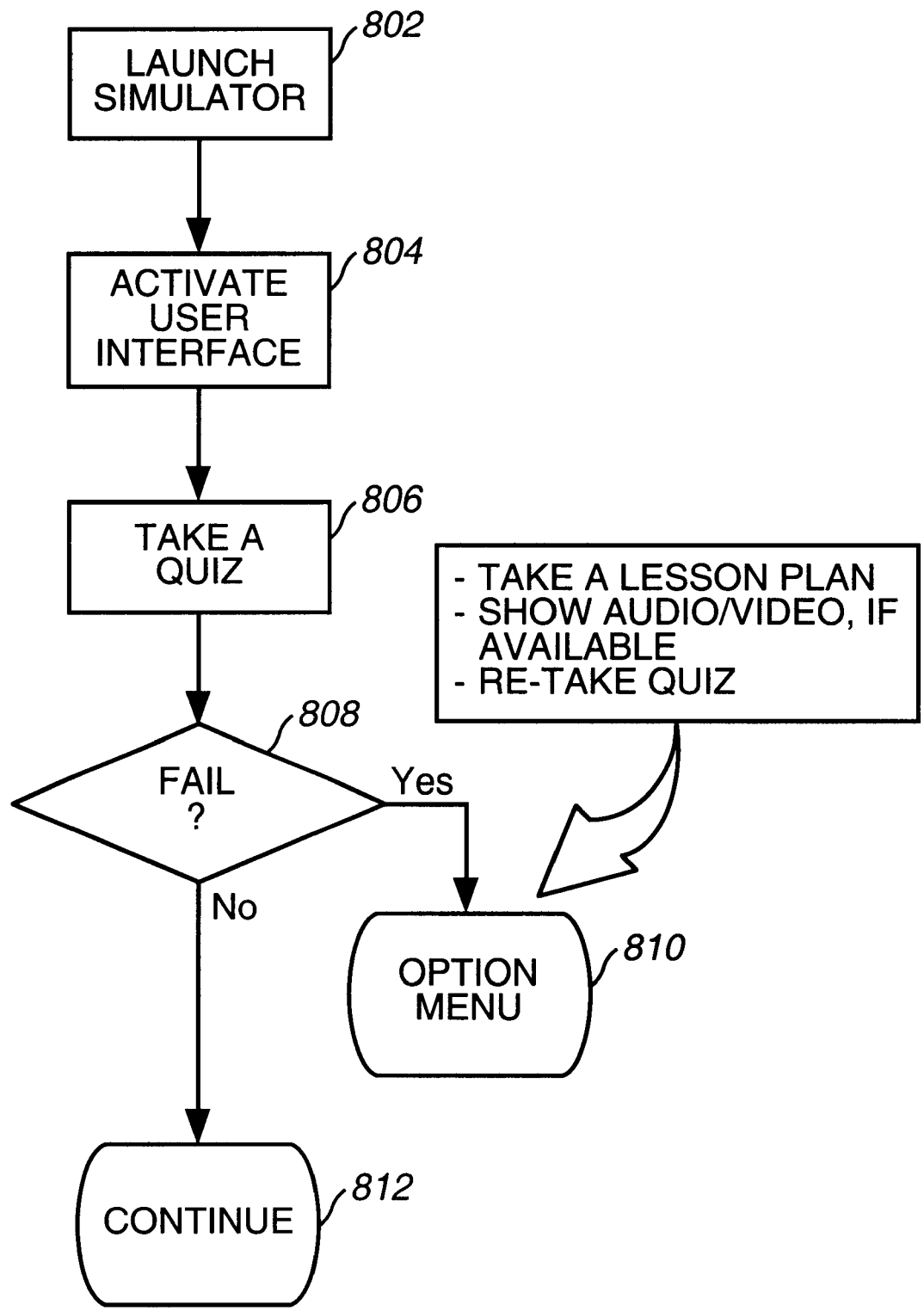
FIG. 8 is a flow diagram of a test-taking process provided in the ICBT system of the present invention.

FIG. 8 depicts a flow diagram of an exemplary test-taking process or evaluation session provided as part of the ICBT system of the present invention. In a presently preferred exemplary embodiment, the ICBT simulator system may be launched from a remote computer (i.e., a client) that is connected via the Internet/Intranet to the server on which the system is executed. Those of ordinary skill in the art should readily understand that there is no limitation on the type of hardware or software platforms, whether the server or client, for effectuating the ICBT simulator system of the present invention. Any known or hitherto unknown hardware architectures and Operating Systems may be advantageously employed for the purposes of the present invention. Also, any known or hitherto unknown browser tools operable with IP-based networks may be used for accessing the server site via a suitable protocol, for example, the well-known Hyper-Text Transfer Protocol (HTTP).

Upon executing appropriate authentication procedures, the end-user is authorized to launch the ICBT simulator system (step 802) which may be optimized for a particular piece of equipment such as, for example, a network element (i.e., a router, brouter, or a bridge, et cetera). When a suitable GUI is presented, the end-user may activate one or more portions of the interface to initiate an ICBT session (step 804). By activating a test or quiz menu on the interface, the end-user can take a quiz on a particular topic related to the simulated equipment (step 806). Preferably, a "real-time" assessment of the quiz is done so that if the end-user fails the quiz (decision block 808), a menu of options may be presented from which the end-user can select a suitable option (step 810). For example, the option menu may include a link to an appropriate lesson plan, a relevant multimedia presentation (if available), or an option to re-take the quiz. On the other hand, upon successfully completing the quiz, the end-user may continue with other ICBT sessions (step 812) or may conclude the testing session. Further, because of the flexible modularity of the ICBT system of the present invention, the end-user can elect to take additional lesson plans, launch related multimedia presentations, query on-line help modules, etc.

Figure 9:
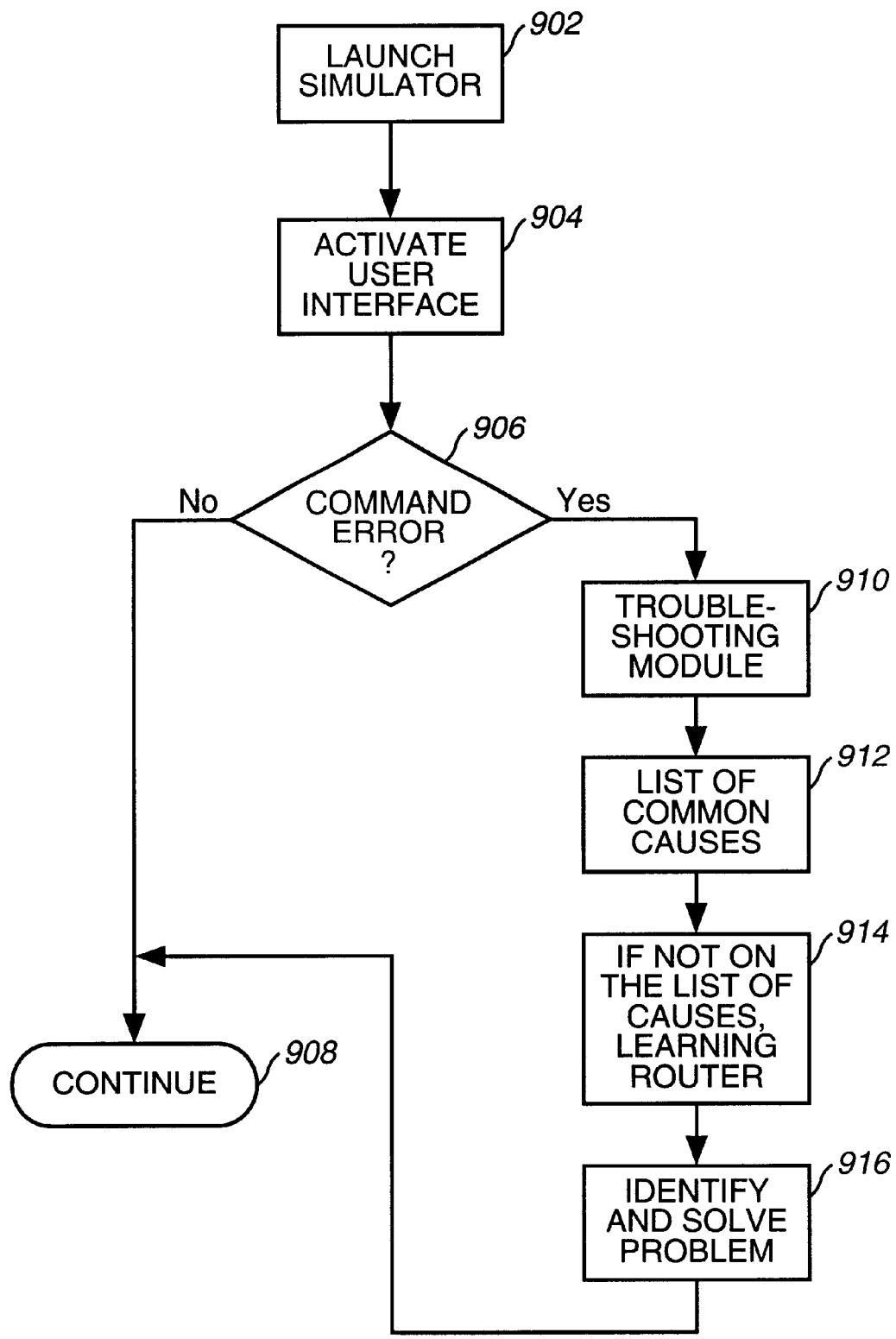
FIG. 9 depicts a flow diagram of an ICBT session using an adaptive-learning troubleshooting module provided in accordance with the teachings of the present invention.

Referring now to FIG. 9, depicted therein is a flow diagram of an adaptive troubleshooting session provided in the ICBT system of the present invention. In this example, after launching the ICBT simulator system (step 902) and activating the user interface (step 904) as described hereinabove, the end-user initializes and configures the device in accordance with a lesson plan, learning module, etc. Thereafter, the end-user enters a command for effectuating a hardware, software, or firmware function of the emulated device. If an error is reported by the command inference engine of the ICBT simulator (decision 906), the end-user may activate an appropriate troubleshooting module (step 910). In accordance with the teachings of the present invention, the troubleshooting module maintains a personal profile for the end-user in terms of the end-user's prior configuration/installation settings, command usage, prior errors and causes therefor, et cetera, in a historical database. Based on this "intelligence," a list of most common causes that are likely to have caused the particular error is returned by the ICBT system (step 912). If the actual cause of the error is not on the list, a learning routine in the troubleshooting module is activated (step 914) so that the "new" cause is added to the personal profile of the end-user when the problem is subsequently identified and solved (step 916). In this manner, the personal profile of the end-user is adaptively updated, thereby reducing the time associated with troubleshooting in the field. Once again, because of the flexible modularity of the simulator system, the end-user has the option of continuing with the ICBT session is any appropriate manner, including session termination (step 908).

Figure 10A:
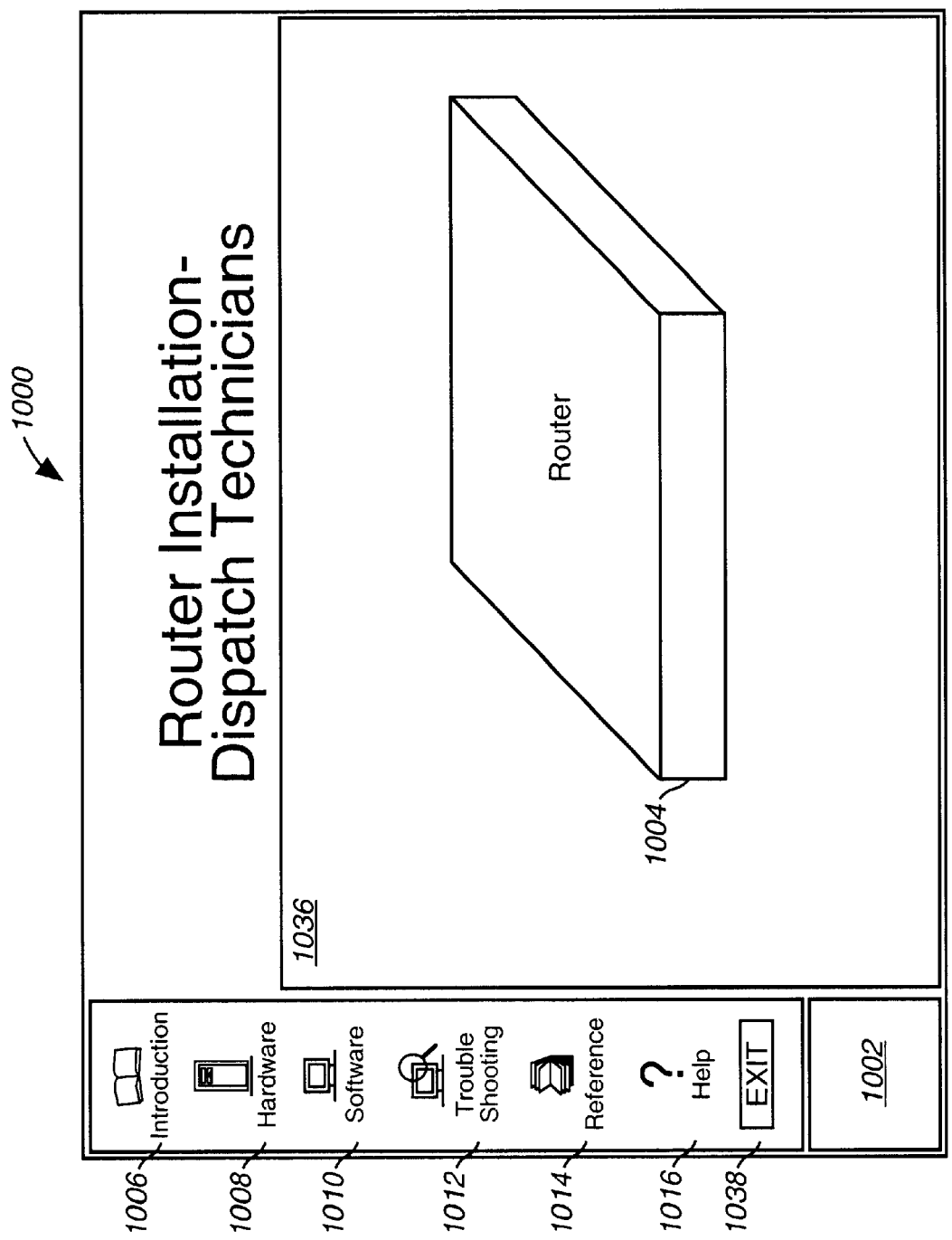
FIGS. 10A through 10N are exemplary screen shots of a presently preferred ICBT system implemented for a router.
Figure 11:
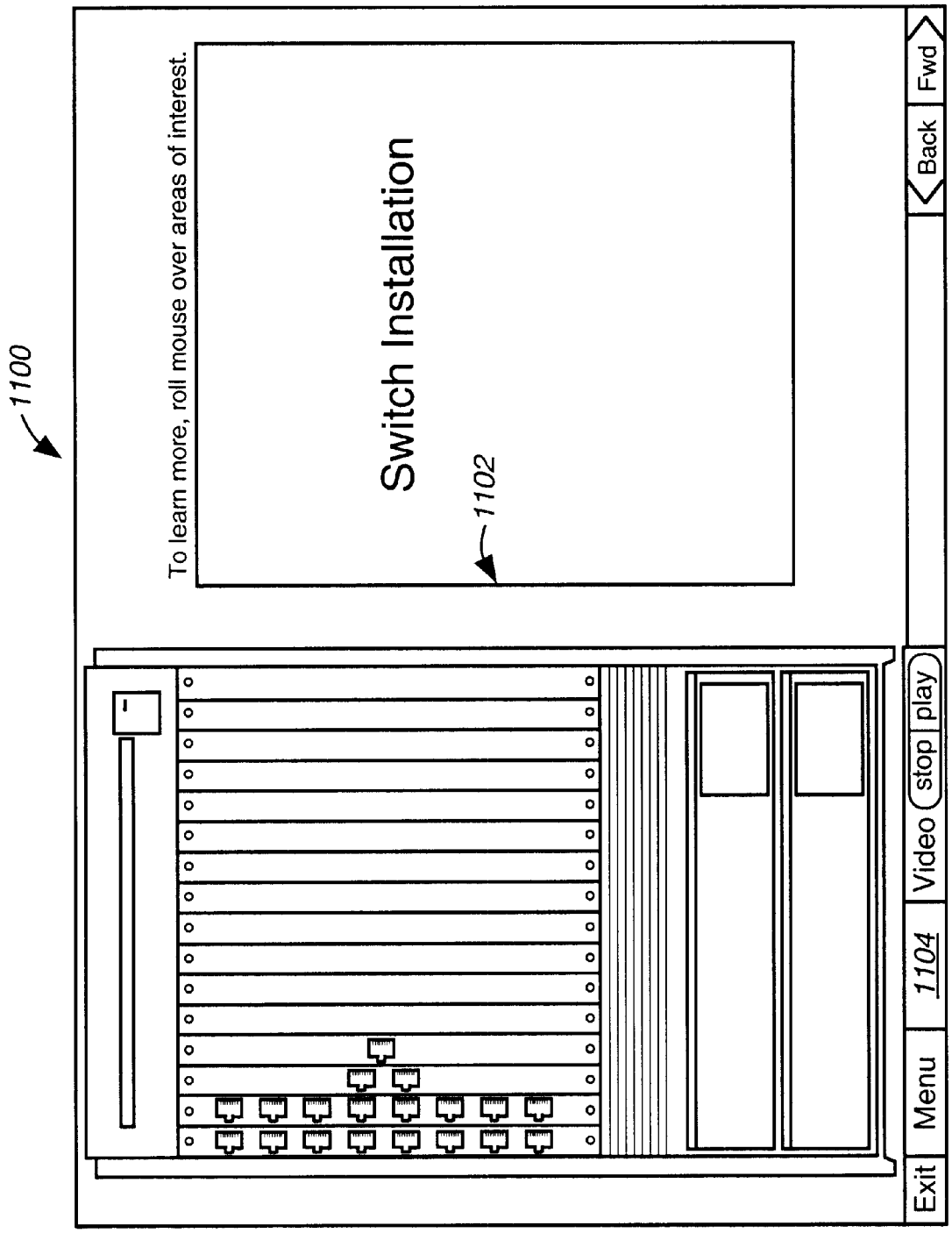
FIG. 11 is an exemplary screen shot of a presently preferred ICBT system implemented for a switch.

FIGS. 10A through 10N depict exemplary screen shots of a presently preferred ICBT system implemented for a router device. FIG. 11 is an exemplary screen shot of a presently preferred ICBT system implemented for a network switch. It is believed that the contents of the these exemplary screen shots are self-explanatory and, accordingly, only some of the salient features are described in greater detail hereinbelow.

FIG. 10A illustrates an initial GUI screen 1000 for router installation. A main menu bar 1002 includes a plurality of icons exemplifying the inter-dependent modular architecture of the present invention. An INTRODUCTION icon 1006, HARDWARE icon 1008, SOFTWARE icon 1010, TROUBLE SHOOTING icon 1012, REFERENCE icon 1014 and a HELP icon 1016 are provided. An EXIT option 1038 allows the end-user to de-activate and/or terminate an ICBT session. As is well-known, the end-user can click on any of the main options by pointing an appropriate input device (e.g., a mouse) on one of several icons of the main menu bar 1002. A main display area 1036 may initially preferably illustrate a router 1004. Those of ordinary skill in the art will recognize that appropriate company logos, equipment manufacturer's identification, markings and/or logos, 3-D animated presentations, et cetera, may also be included to enhance the interactive experience of the ICBT system.

Figure 10B:
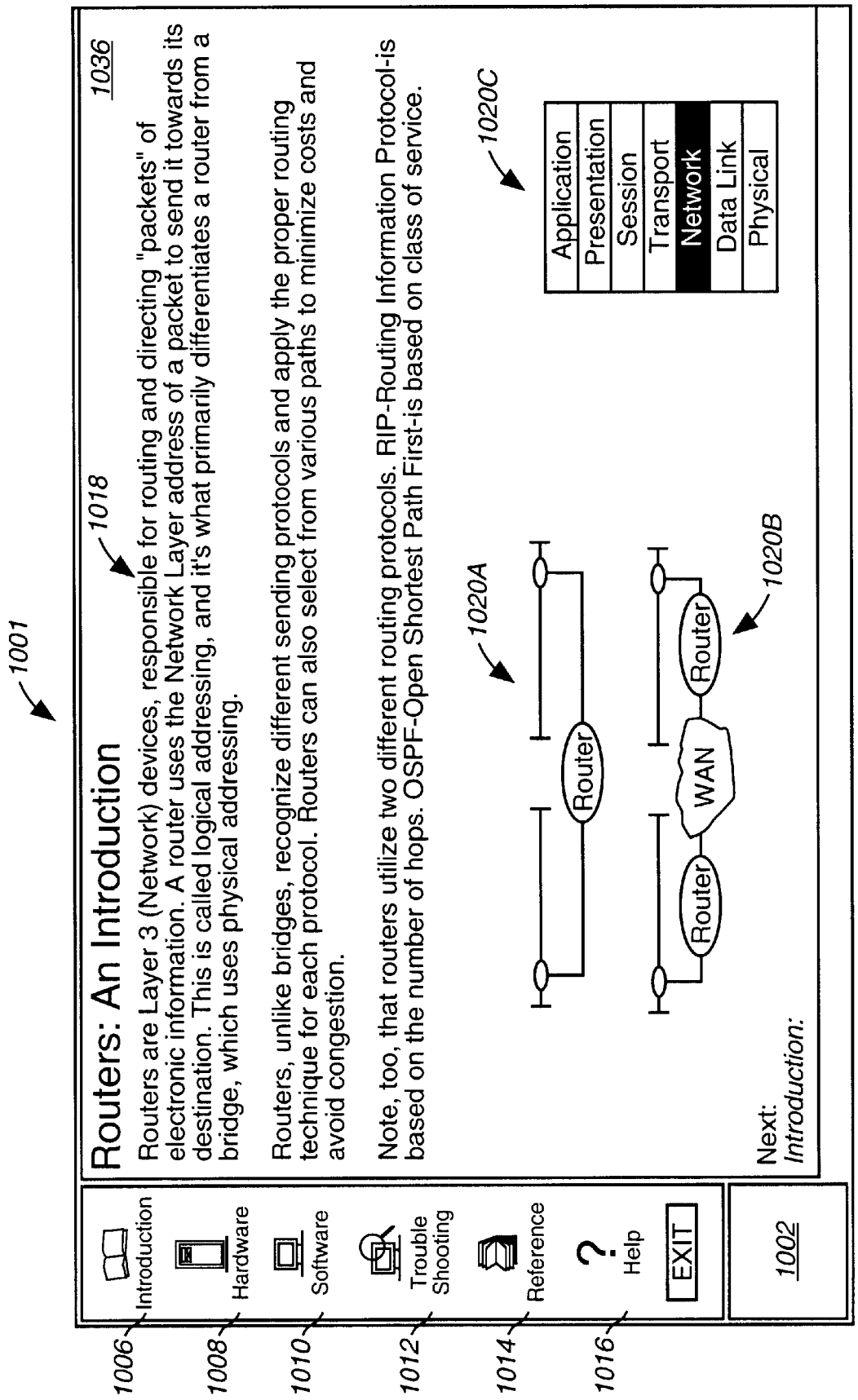

FIG. 10B illustrates a screen shot 1001 associated with the INTRODUCTION icon 1006. The main display area 1036 preferably includes a text portion 1018 for presenting appropriate technology background information on routers. A plurality of graphics areas, e.g., graphics areas 1020A through 1020C, are also provided to visually enhance the background information on the device being emulated.

Figure 10C:
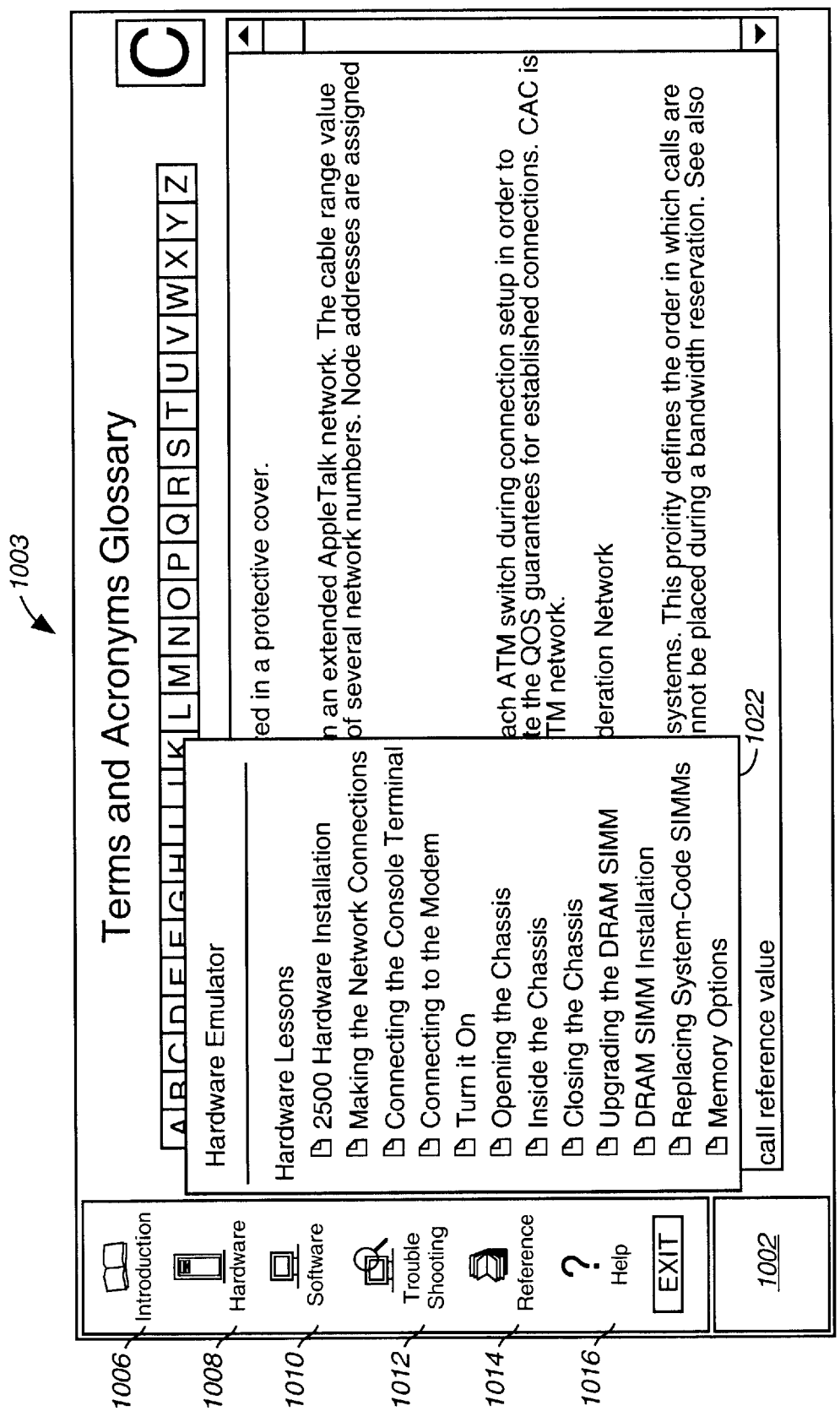
Figure 10D:
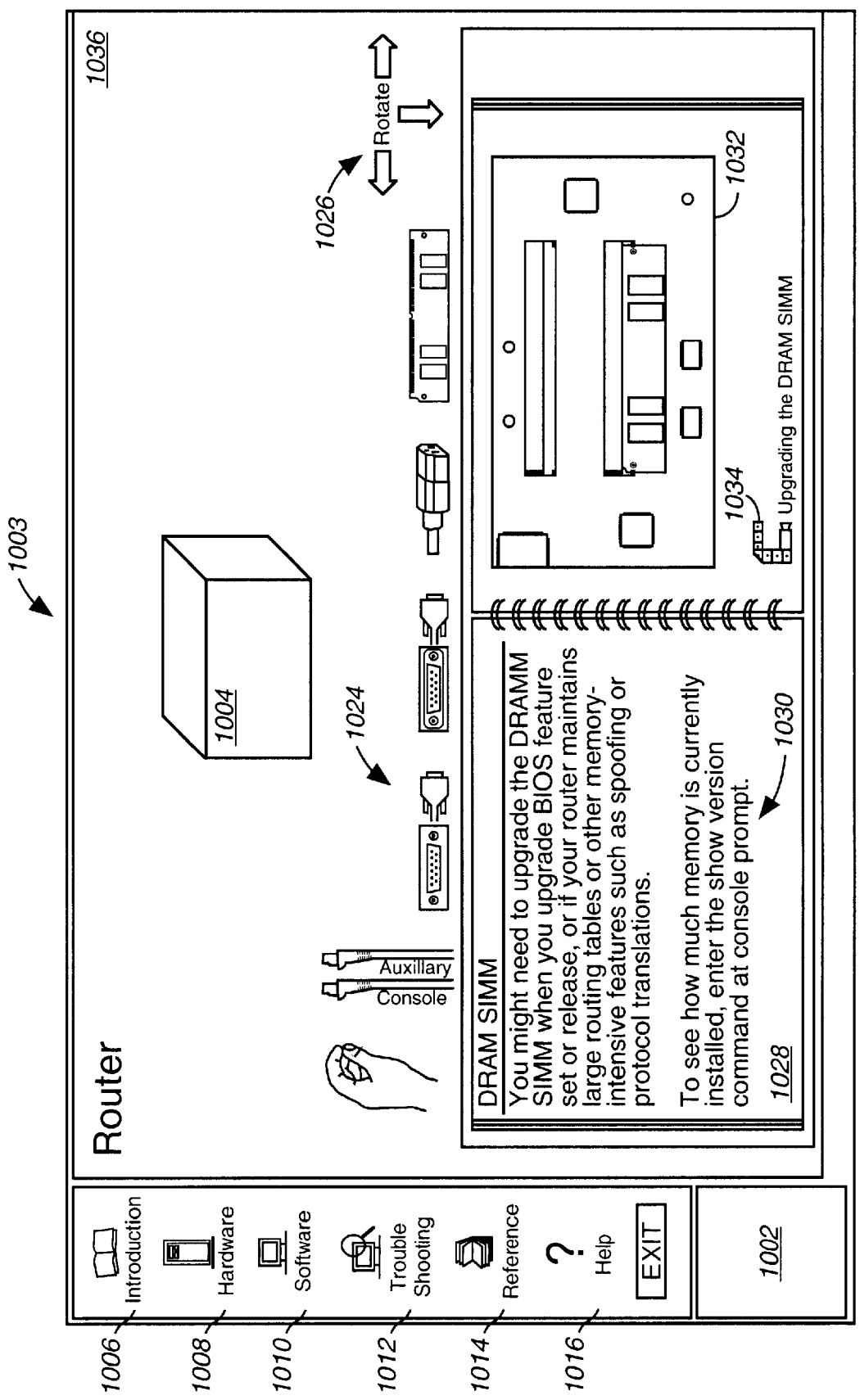

FIG. 10C illustrates a hardware emulator screen shot 1003 associated with the HARDWARE icon 1008. A plurality of lesson plans are provided as a pull-down option menu 1022. FIG. 10D depicts a screen shot 1005 that is generated when one of these lesson plans is activated. The lesson plan screen shot 1005 preferably includes a multimedia-enhanced device book portion 1028 which shows text information 1030 relating to the hardware plan selected, a graphics image 1032 for the relevant hardware component, and a video clip 1034 therefor. Also shown in the main display area 1036 is a hardware components area 1024 wherein an appropriate supplies list, e.g., connectors, cables, ports, straps, etc. are "iconized" for selection by the end-user. The router 1004 is rotatable by manipulating a ROTATE arrow icon 1026 so that both the front- and back-sides of the router may be examined and used for appropriately connecting the several cables and connectors provided therewith.

Figure 10E:
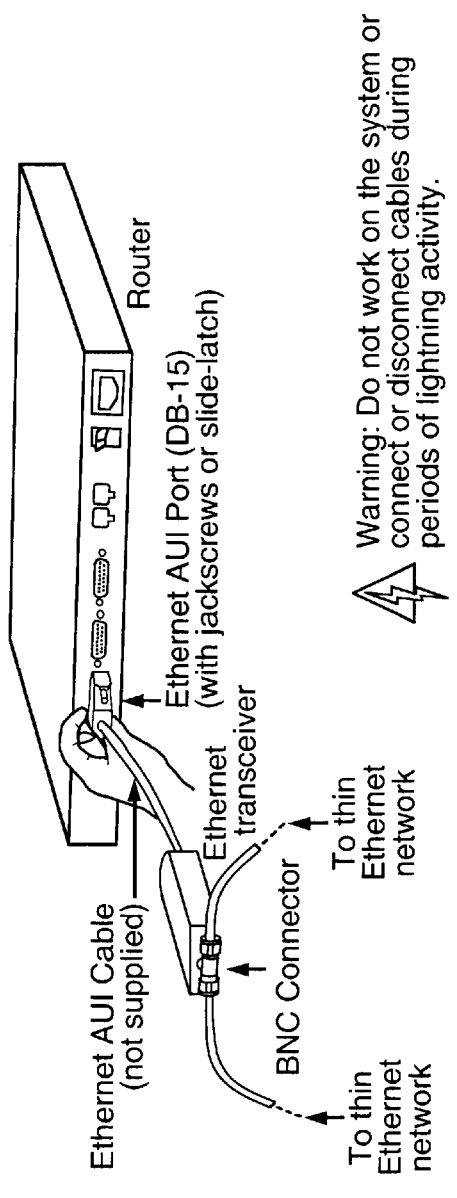
Figure 10E:
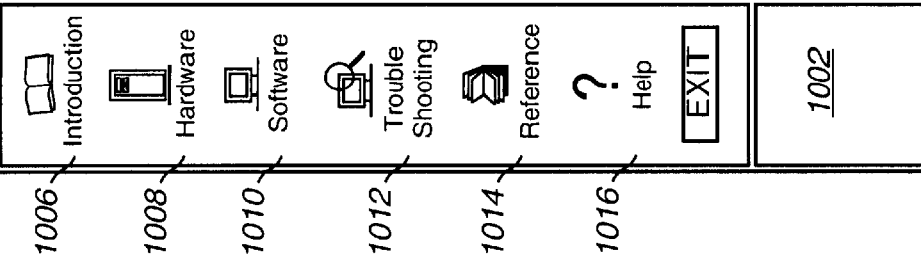
Figure 10F:
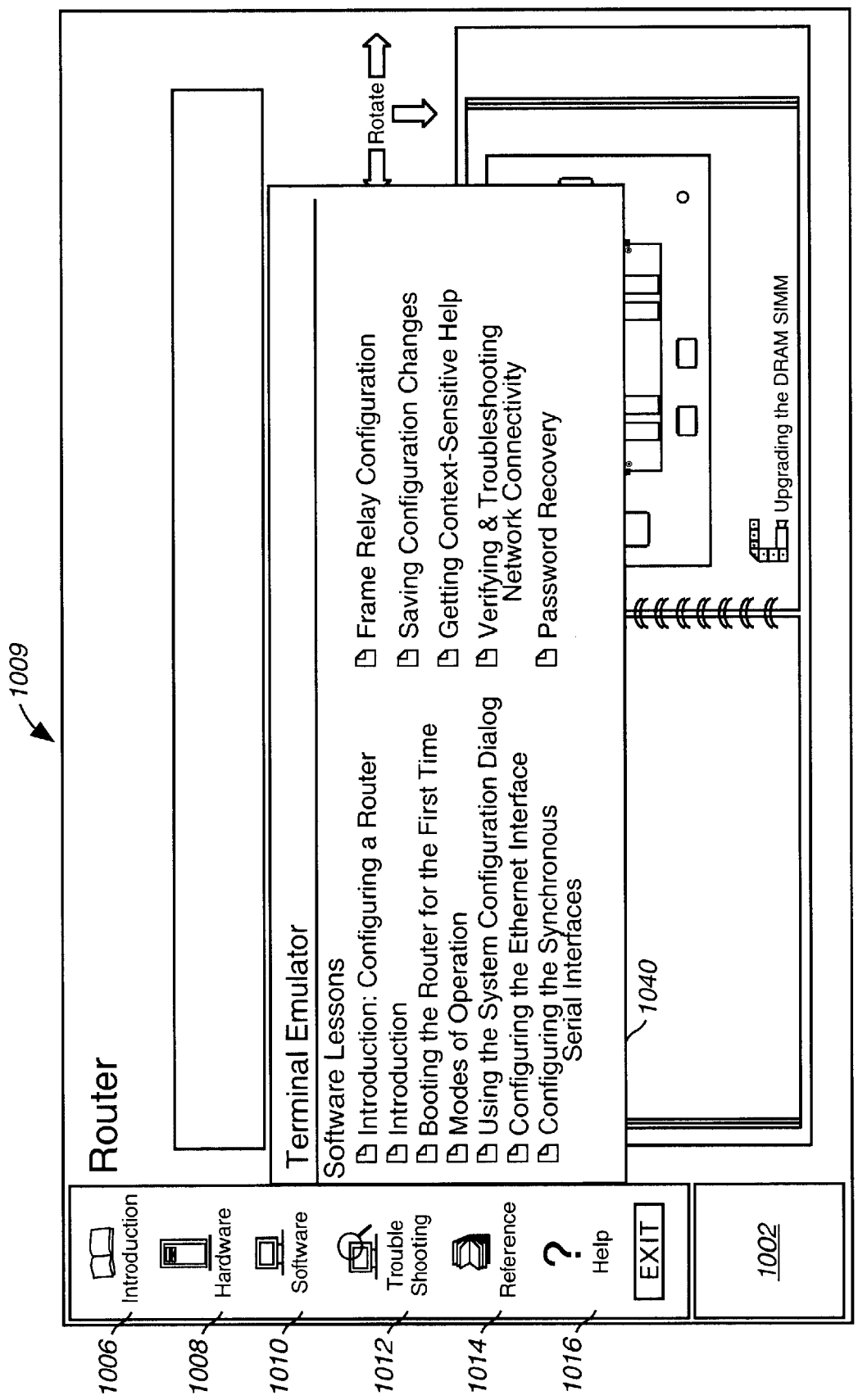

FIG. 10E illustrates another exemplary hardware lesson screen shot 1007 for making the network connections, that is, for emulating the router connections within a network. FIG. 10F exemplifies a terminal emulator screen shot 1009 which shows a pull-down menu 1040 for selecting from a plurality of software lessons.

FIG. 10G provides a software command reference screen shot 1011. The commands are preferably grouped in a COMMAND CATEGORIES list 1042. A scrollable dialog box 1044 provides the relevant commands that are selected from the command category. Another scrollable dialog box 1046 provides the use, syntax and format of a particular command.

Figure 10H:
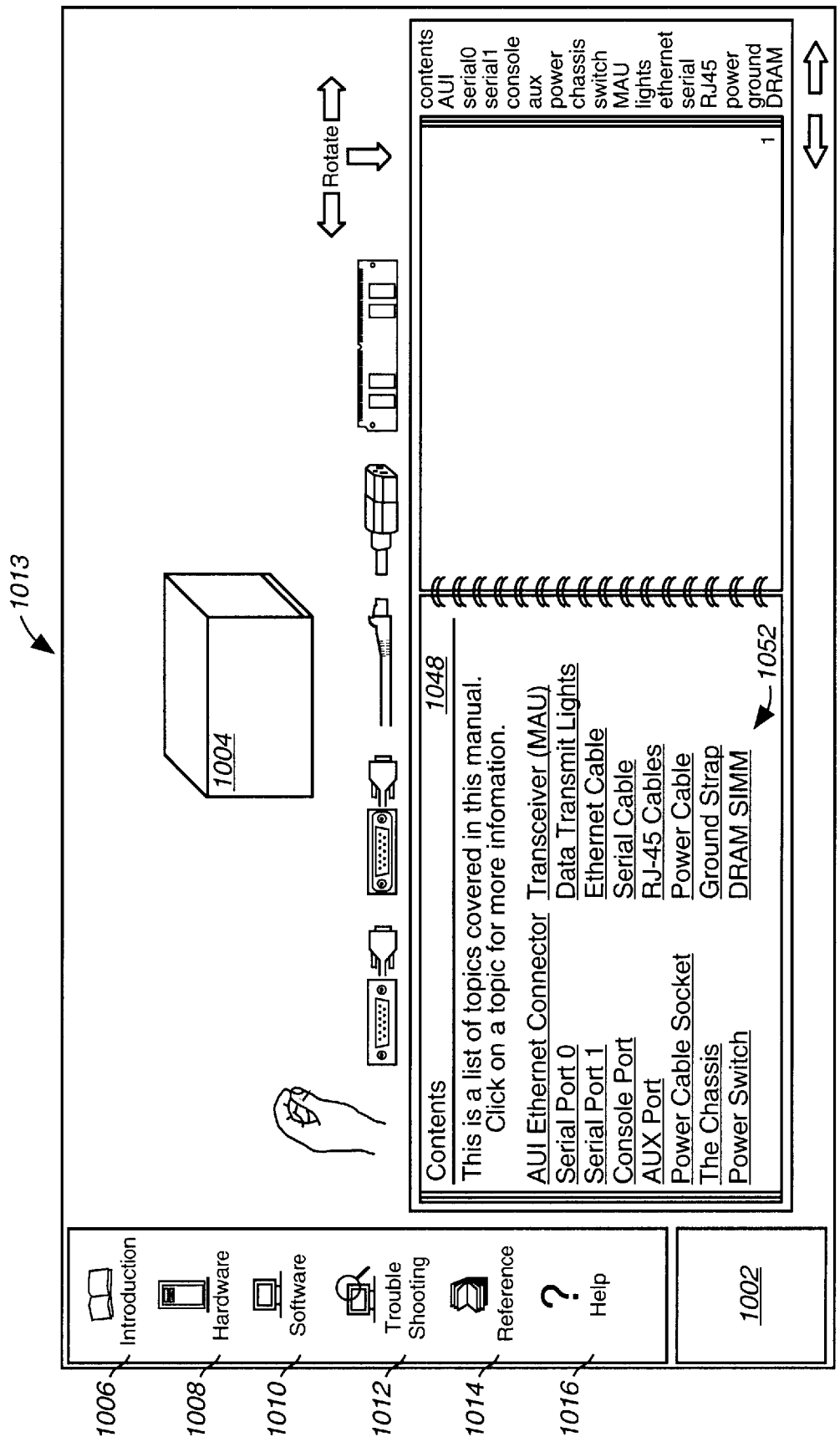
Figure 10I:
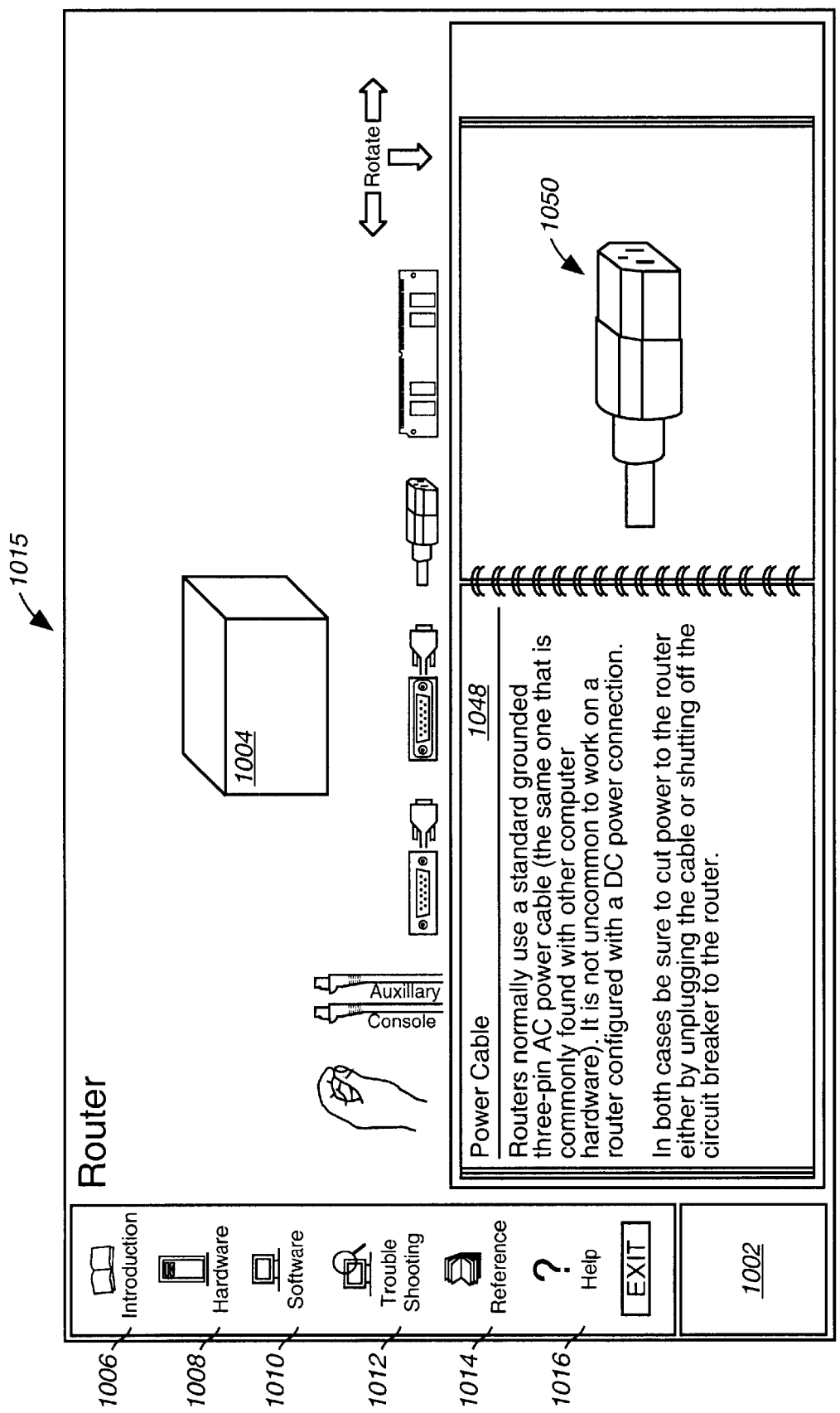
Figure 10J:
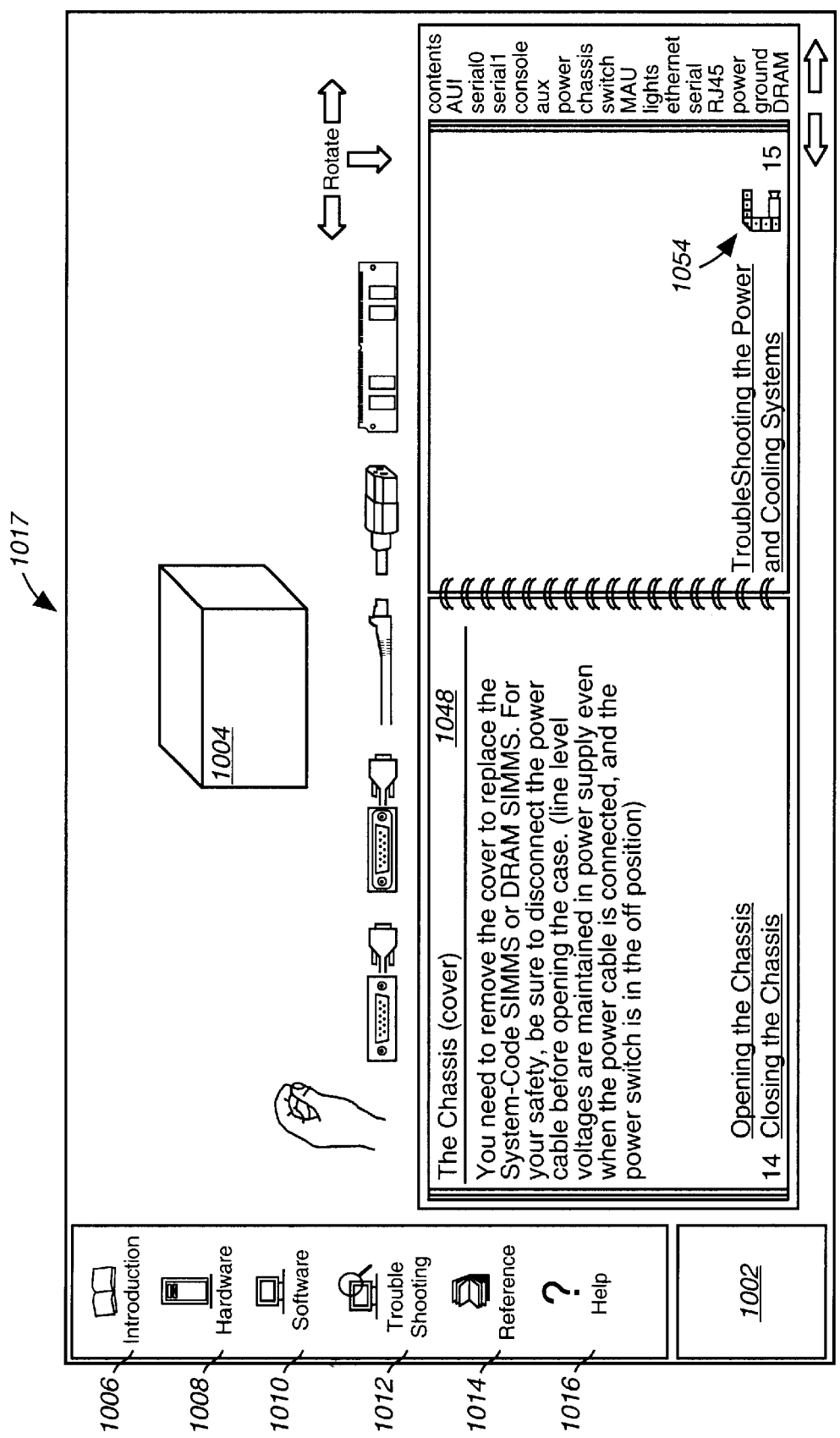
Figure 10K:
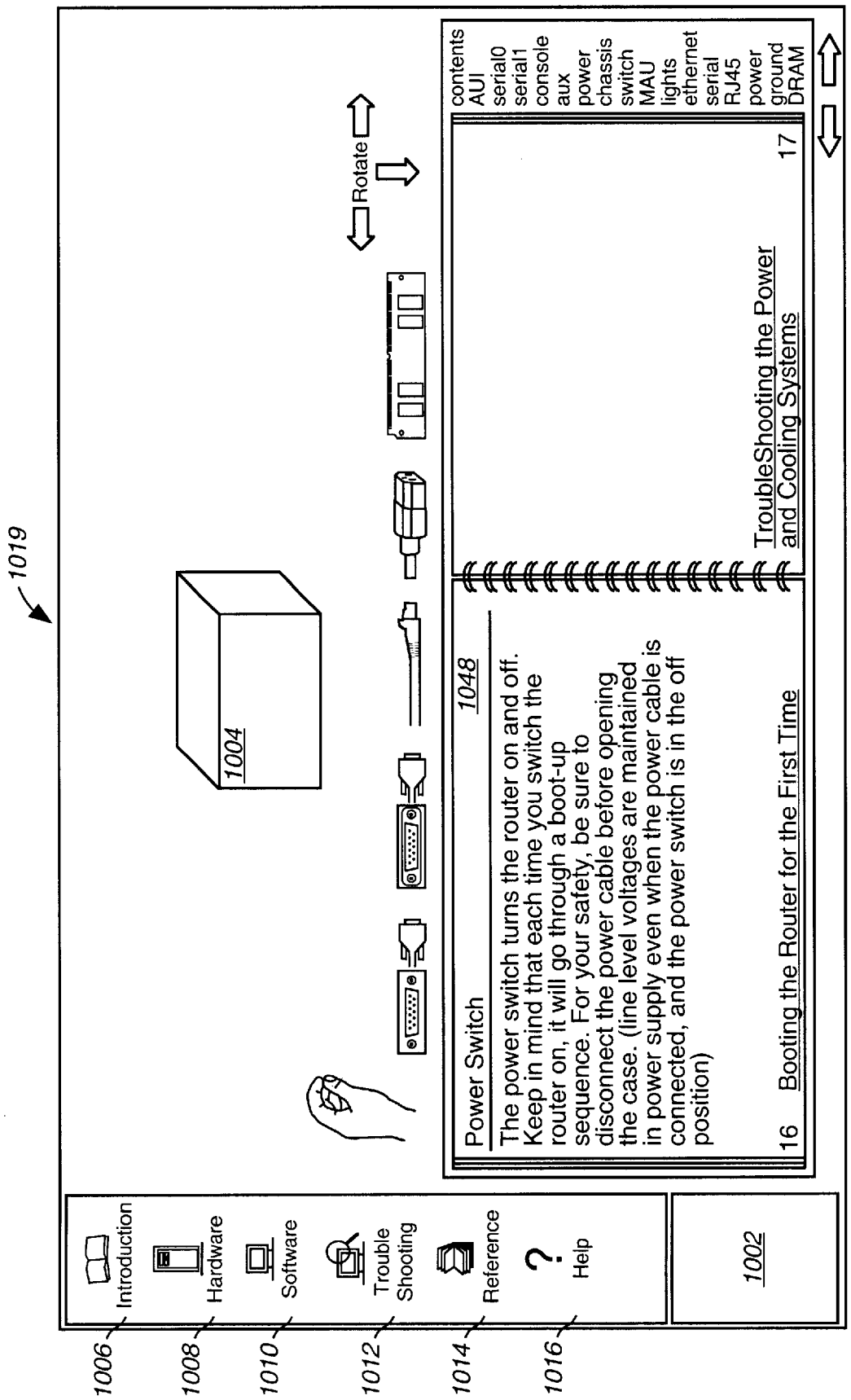
Figure 10I:
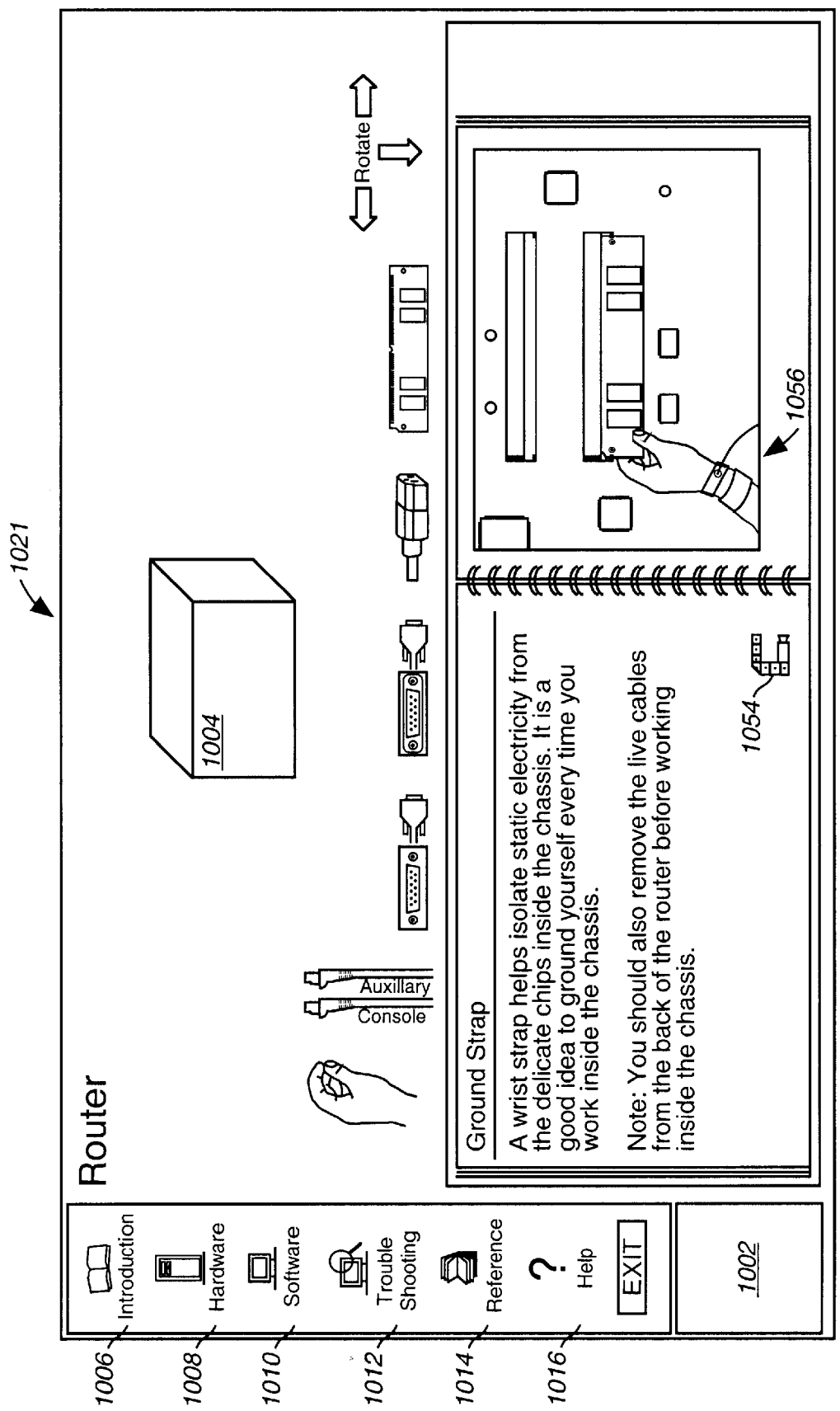

As shown in FIG. 10H, a reference manual is provided as a device book 1048, having the contents therein organized into several topics 1052, and is preferably provided to be activatable from the hardware emulator as exemplified in FIG. 10C. FIG. 10I illustrates a screen shot 1015 for power cable reference, with a graphics image 1050 therefor. Similarly, FIG. 10J illustrates a screen shot 1017 for providing reference to the chassis, with a video clip 1054. Reference to the power switch of the router is exemplified in the screen shot 1019 depicted in FIG. 10K. Reference to a ground strap used by technicians while working on routers is exemplified in the screen shot 1021 shown in FIG. 10L.

FIG. 10M illustrates a screen shot 1023 for an exemplary quiz plan. An on-line glossary screen 1025 is illustrated in FIG. 10N. Preferably, the terms and acronyms included in the glossary are provided in a scrollable dialog box provided in the main display area 1036 of the GUI.

Whereas the GUI of the router simulator system described above is provided to be more "icon-rich," a different "look and feel" is provided for the exemplary GUI screen shot 1100 of a presently preferred network switch simulator shown in FIG. 11. However, it should be understood that the underlying inter-dependent modular architecture that integrates hardware and software state transition schemes, lesson plans, troubleshooting modules is essentially similar to the router simulator architecture, except for the necessary and appropriate switch-specific modifications. Accordingly, it should be appreciated that the modular ICBT system of the present invention may be provided for any piece of equipment that can be characterized in discrete states and components, and the "look and feel" of the user interface may be as variable as a particular implementation may allow or require.

Based on the foregoing, it should be appreciated that the present invention advantageously provides a highly interactive CBT system that overcomes the deficiencies and shortcomings of the prior art in terms of ease of use, flexibility, and more "real-life" training necessary for effective job performance. Because the ICBT system of the present invention may be accessed via a computer network on a 24-hour/seven-days-a-week basis as needed, no travel time or expense is needed to provide high quality training to a distributed work force.

In addition, it should be further appreciated that the equipment simulators of the ICBT system can be used as a reference tool as well as a training tool, thereby reducing or obviating the need for a centralized technical support staff. Also, by employing a suitable Web-based framing format, virtually an unlimited number of technicians can be trained at the same time at their own job stations, each taking only those sections or lesson plans suited to his or her current training session.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the presently preferred exemplary embodiments of the present invention have been implemented using ToolBook, an application authoring package based on OpenScript language, it should be realized that the present invention may be practiced using any programming medium including, for example, one with appropriate dynamic link libraries (DLLs) coded in C or C++ language, etc. Also, whereas the teachings of the present invention have been particularly exemplified with a router device, it should be apparent as mentioned hereinabove that virtually any piece of equipment (e.g., customer premises equipment, switching equipment such as data, voice and multimedia switches, testing equipment, and the like) whose behavior can be simulated (i.e., modeled) using state machine transitions can be provided with a suitable ICBT system therefor. In addition, individual screen shots and dialog boxes have been provided by way of example only and should not be interpreted as providing limitations of any kind with respect to the teachings of the present invention. Clearly, the sequence or order of such screen shots and their contents may be presented in numerous permutations/combinations thereof. Accordingly, it should be clearly understood that these and other variations, substitutions, additions, re-arrangements and modifications are contemplated to be within the ambit of the present invention whose scope is solely limited by the claims set forth below.

What is claimed is:

1. An interactive computer-based training (CBT) system operable over a computer network for training users, comprising:

a hardware simulator based on a state machine engine for emulating a plurality of hardware states associated with a piece of equipment on which said users receive interactive training;

a software simulator coupled to and inter-dependent on said hardware simulator, said software simulator having a command inference engine that allows said users to interactively interrogate said emulated piece of equipment by entering one or more software functionality commands;

a plurality of independently selectable learning modules, each including one or more lesson plans related to the hardware and software functionality of said emulated piece of equipment, wherein said learning modules are inter-dependently associated with said hardware and software simulators; and a user interface for selecting one or more of said learning modules and for providing inputs from said users to said hardware and software simulators of said emulated piece of equipment.

2. The interactive CBT system as set forth in claim 1, further comprising a troubleshooting module that is activatable from said user interface, said troubleshooting module including a user profile for each of said users, said user profile including a list of causes of a particular command error encountered by a user in said user's previous training sessions on the interactive CBT system.

3. The interactive CBT system as set forth in claim 2, wherein said troubleshooting module adaptively updates said list of causes for said user with respect to said particular command error.

4. The interactive CBT system as set forth in claim 1, wherein said learning modules include one or more multimedia presentations associated with said lesson plans.

5. The interactive CBT system as set forth in claim 1, wherein said piece of equipment comprises a network element.

6. The interactive CBT system as set forth in claim 1, wherein said piece of equipment comprises testing equipment.

7. The interactive CBT system as set forth in claim 1, wherein said piece of equipment comprises a router.

8. The interactive CBT system as set forth in claim 1, wherein said piece of equipment comprises customer premises equipment.

9. The interactive CBT system as set forth in claim 1, wherein said piece of equipment comprises switching equipment.

10. The interactive CBT system as set forth in claim 1, wherein said state machine engine operates to make transitions from a current state to a future state based on tracking one or more dependencies of said current state on previous states.

11. The interactive CBT system as set forth in claim 10, wherein said dependencies of said current state on previous states include a direct dependency.

12. The interactive CBT system as set forth in claim 10, wherein said dependencies of said current state on previous states include an indirect dependency.

13. An interactive computer-based training (CBT) system for training users on a piece of equipment having hardware and software, comprising:
   means for simulating the hardware functionality of said piece of equipment;
   means for simulating the software functionality of said piece of equipment, wherein said means for simulating the software functionality is inter-dependent on said means for simulating the hardware functionality;
   a plurality of independently selectable learning modules, each including one or more lesson plans related to the hardware and software functionality of said piece of equipment, wherein said learning modules are inter-dependently associated with said means for simulating the hardware functionality and said means for simulating the software functionality;
   means for selecting one or more of said learning modules and for providing inputs from said users to effectuate different hardware and software configurations of said piece of equipment; and
   a troubleshooting module wherein a user profile is maintained for each of said users, said user profile including a list of causes of a particular command error encountered by a user in said user's previous training sessions on the interactive CBT system.

14. The interactive CBT system as set forth in claim 13, wherein said learning modules include one or more multimedia presentations associated with said lesson plans.

15. The interactive CBT system as set forth in claim 13, wherein said troubleshooting module adaptively updates said list of causes for said user with respect to said particular command error.

16. The interactive CBT system as set forth in claim 13, further including means for providing on-line help with respect to said lesson plans.

17. An interactive computer-based training (CBT) method for training users on a piece of equipment having hardware and software functionality, comprising the steps of:
   simulating the hardware functionality of said piece of equipment;
   simulating the software functionality of said piece of equipment, wherein said step of simulating the software functionality is inter-dependent on said step of simulating the hardware functionality;
   providing a plurality of independently selectable learning modules, each including one or more lesson plans related to at least one of the hardware and software functionalities of said piece of equipment;
   providing inputs from said users to effectuate different hardware and software configurations of said piece of equipment; and
   selecting one or more of said learning modules based on said different hardware and software configurations of said piece of equipment.

18. The interactive CBT method as set forth in claim 17, further including the step of taking one or more tests relating to the hardware and software functionality of said piece of equipment at any point during a CBT session.

19. The interactive CBT method as set forth in claim 17, wherein said step of selecting one or more leaning modules includes launching a multimedia presentation.

20. The interactive CBT method as set forth in claim 17, wherein said step of selecting one or more leaning modules includes launching an on-line help session.

* * * * *